United States Patent
Wakaki et al.

(10) Patent No.: US 8,362,157 B2
(45) Date of Patent: Jan. 29, 2013

(54) POLYLACTIC ACID COMPOSITION AND MOLDING COMPRISING THE COMPOSITION

(75) Inventors: Hiroyuki Wakaki, Koga (JP); Junichi Narita, Koga (JP)

(73) Assignee: Tohcello Co., Ltd., Tokyo (JP)

( * ) Notice: Subject to any disclaimer, the term of this patent is extended or adjusted under 35 U.S.C. 154(b) by 1177 days.

(21) Appl. No.: 11/908,226

(22) PCT Filed: Mar. 10, 2006

(86) PCT No.: PCT/JP2006/305302
§ 371 (c)(1),
(2), (4) Date: Sep. 8, 2008

(87) PCT Pub. No.: WO2006/095923
PCT Pub. Date: Sep. 14, 2006

(65) Prior Publication Data
US 2009/0035585 A1    Feb. 5, 2009

(30) Foreign Application Priority Data

| Mar. 10, 2005 | (JP) | 2005-066591 |
| Oct. 20, 2005 | (JP) | 2005-305878 |
| Dec. 28, 2005 | (JP) | 2005-380484 |
| Jan. 4, 2006 | (JP) | 2006-000279 |

(51) Int. Cl.
*C08G 63/91* (2006.01)

(52) U.S. Cl. ........ 525/411; 525/410; 525/415; 525/450; 428/220; 428/333; 428/334; 428/337; 428/339; 428/480

(58) Field of Classification Search .................. 428/220, 428/333, 334, 337, 339, 480; 525/410, 411, 525/415, 450
See application file for complete search history.

(56) References Cited

U.S. PATENT DOCUMENTS 4,719,246 A * 1/1988 Murdoch et al. .............. 521/134

FOREIGN PATENT DOCUMENTS

| JP | 2000017163 A | 1/2000 |
| JP | 2005042084 A | 2/2005 |
| JP | 2005-325285 | * 11/2005 |

OTHER PUBLICATIONS

Schmidt, S.C.; Hillmyer, M.A.; Journal of Polymer Science Part B: Polymer Physics, 2000, vol. 39, p. 300-313.*
International Search Report of PCT/JP2006/305302, date of mailing Jun. 13, 2006.

* cited by examiner

*Primary Examiner* — David W Wu
*Assistant Examiner* — Robert Jones, Jr.
(74) *Attorney, Agent, or Firm* — Westerman, Hattori, Daniels & Adrian, LLP

(57) ABSTRACT

The invention aims at providing a polylactic acid composition having specific thermal characteristics and gas barrier properties and at obtaining a polylactic acid composition comprising PLLA and PDLA which composition can form moldings (such as stretched film) excellent in surface smoothness, transparency, heat resistance, and toughness. Specifically, a polylactic acid composition characterized by exhibiting a peak of 30 mJ/mg or above in DSC as determined by cooling at a rate of 10° C./min after the lapse of 10 min at 250° C., preferably a polylactic acid composition characterized by exhibiting a peak (1)/peak (2) ratio of 0.5 or below wherein the peak (1) and peak (2) correspond to a peak of Tm of 150 to 180° C. and a peak of Tm of 200 to 240° C. respectively in DSC as observed in the second heating (namely, re-heating from 0° C. at a rate of 10° C./min which follows the cooling at a rate of 10° C./min conducted after the lapse of 10 min at 250° C.).

31 Claims, 19 Drawing Sheets

US 8,362,157 B2

POLYLACTIC ACID COMPOSITION AND MOLDING COMPRISING THE COMPOSITION

TECHNICAL FIELD

The present invention relates to a polylactic acid composition having specific thermal characteristics. Furthermore, the present invention relates to a composition consisting of a composition of poly-L-lactic acid and poly-D-lactic acid, and also relates to films such as stretch films, injection moldings, blow moldings, vacuum/air pressure moldings, extrusion molding, and other moldings comprising the composition and having excellent thermal resistance, gas barrier properties, toughness, and surface smoothness.

BACKGROUND ART

Highly versatile aliphatic polyesters have been the focus of attention as biodegradable plastics, and polylactic acid (PLA) polybutylene succinate (PBS), polyethylene succinate (PES), and polycaprolactone (PCL) and the like are commercially available.

One application for these biodegradable aliphatic polyesters is the field of films for packaging, agriculture, and foods and the like, and high strength, thermal resistance, gas barrier properties, and biodegradability are basic required characteristics, depending on the application.

Of the aforementioned aliphatic polyesters, PLA consists of poly-L-lactic acid (PLLA) and poly-D-lactic acid (PDLA). The melting point of these individual crystals ($\alpha$ crystals) is approximately 170° C. and the thermal resistance may be insufficient when compared to polyethylene terephthalate and the like, so there is demand for improvement.

On the other hand, various methods of forming a stereocomplex by kneading poly-L-lactic acid (PLLA) and poly-D-lactic acid (PDLA) have been proposed as a method for further improving the thermal resistance of PLA (for examples, patent document 3, patent document 4, and non-patent document 1).

These stereocomplexes (SC) are eutectoid crystals of poly-L-lactic acid (PLLA) and poly-D-lactic acid (PDLA), and the melting point of these crystals is approximately 50° C. higher than the $\alpha$ crystals, and utilization of this property is anticipated.

However, even if a film is formed from a composition obtained simply by melting and kneading PLLA and PDLA, a stereocomplex will not easily be formed, and although the film that is formed will have improved thermal resistance, the film will be brittle and use as a packaging film will be difficult.

Therefore, the present inventors have proposed that an stretch film with excellent thermal resistance and toughness can be obtained by at least uniaxially stretching at specific conditions a composition obtained by melting and kneading PLLA and PDLA (Patent application 2004-146239).

This stretch film has a wide angle x-ray diffraction peak (2θ) around 16° (Hereinafter a peak detected in this region will be referred to as (PPL).), and the total area (SSC) of the diffraction peaks (2θ) in the vicinity of 12°, in the vicinity of 21°, and in the vicinity of 24° (Hereinafter the peaks detected in these regions will be jointly referred to as (PSC).) is less than 10% with respect to the sum of (SSC) and the area (SPL) of the diffraction peak (PPL) in the vicinity of 16°.

Therefore, the SC crystals in the stretch film are more rare than the individual crystals of PLLA and PDLA.

Furthermore, the present inventors have proposed a method for manufacturing a stretch film primarily consisting of SC crystals with major wide angle x-ray diffraction peaks (2θ) in the vicinity of 12°, in the vicinity of 21°, and in the vicinity of 24°, by performing a specific heat treatment on the stretch film (Patent application 2004-146240).

Furthermore, methods for forming a layer of inorganic oxide, inorganic nitride, or inorganic nitride oxide have been proposed as a method for improving the gas barrier properties of polylactic acid based biaxial stretch films (patent document 5). However, these vapor deposition methods or the like are difficult and expensive to implement, and the vapor deposition film is extremely thin, so control of the barrier properties or the like has been a problem.

[Patent document 1] Japanese Patent Application Laid-open No. H7-207041
[Patent document 2] Japanese Patent Application Laid-open No. H8-198955
[Patent document 3] Japanese Patent Application Laid-open No. H8-25400
[Patent document 4] Japanese Patent Application Laid-open No. 2000-17164
[Patent document 5] Japanese Patent Application Laid-open No. H10-24518
[Non-patent document 1] Macromolecules, 20, 904 (1987)

DISCLOSURE OF THE INVENTION

The present invention relates to a polylactic acid composition with specific thermal properties, and an object of the present invention is to provide a film such as a stretch film, injection molding, blow molding, vacuum or air pressure molding, extrusion molding or other molding with excellent surface smoothness, transparency, thermal resistance, barrier properties, and toughness.

As a result of diligent research to achieve the aforementioned object, the present inventors have discovered that a stereocomplex structure can selectively and easily be made by the steps of melting and kneading poly-L-lactic acid (PLLA) and PDLA under specific conditions, and a film such as a stretch film, injection molding, blow molding, vacuum/air pressure molding or extrusion molding made from this composition will have excellent surface smoothness and transparency along with excellent thermal resistance, gas barrier performance, and toughness, and have thus achieved the present invention.

In other words, the present invention relates to a polylactic acid composition characterized in that when measured by DSC, the cooling (10° C./minute) peak after 10 minutes at 250° C. is no less than 30 mJ/mg, preferably no less than 45 mJ/mg, and particularly preferably no less than 50 mJ/mg.

Furthermore, when measured during the DSC second heating (cooling at a rate of 10° C./minute after 10 minutes at 250° C., and heating again from 0° C. at a rate of 10° C./minute), a suitable composition of the present invention has a peak ratio (peak 1/peak 2) of the peak when Tm=150 to 180° C. (peak 1) and the peak when Tm=200 to 240° C. (peak 2) that is 0.5 or less, preferably 0.3 or less, and even more preferably 0.2 or less.

Furthermore, the present invention provides a polylactic acid composition characterized in that when measured by DSC during the second heating (cooling at a rate of 10° C./minute after 10 minutes at 250° C., and heating again from 0° C. at a rate of 10° C./minute) the peak when Tm is between 200 and 240° C. (peak 2) is no less than 35 mJ/mg.

These lactic acid compositions are preferably composed of, or in other words are prepared from between 25 and 75 weight parts, preferably between 35 and 65 weight parts, and more preferably between 45 and 55 weight parts of poly-L- lactic acid and between 75 and 25 weight parts, preferably between 65 and 35 weight parts, and more preferably between 55 and 45 weight parts of poly-D-lactic acid (with the amount of poly-L-lactic acid and poly-D-lactic acid totaling 100 weight parts).

These compositions can be obtained by kneading a lactic acid composition comprising for example between 25 and 75 weight parts, preferably between 35 and 65 weight parts, and more preferably between 45 and 55 weight parts of poly-L-lactic acid and between 75 and 25 weight parts, preferably between 65 and 35 weight parts, and more preferably between 55 and 45 weight parts of poly-D-lactic acid at a temperature between 230 and 260° C., and preferably providing the melting and kneading energy using a twin screw extruder. The melting and kneading time using a batch type low shear mixer such as a Brabender is normally 10 minutes or longer, preferably 15 minutes or longer, but at longest no more than 60 minutes, and preferably no more than 40 minutes. Furthermore, when a high shear machine such as a twin screw extruder is used, normally the time is generally 2 minutes or longer, and particularly 4 minutes or longer, but at longest 15 minutes or less.

Kneading with the present invention is preferably performed by sufficiently drying the raw materials, and then under a nitrogen seal or the like, melting and kneading while providing a load such that the weight average molecular weight of the composition obtained will be in a range between 0.3 and 0.6 times, more preferably in a range between 0.4 and 0.6 times the value for the weight average molecular weight obtained by taking the weighted average of each of the weight average molecular weights of the poly-L-lactic acid and poly-D-lactic acid to be used. The poly-L-lactic acid and poly-D-lactic acid in the composition obtained thereby will be very finely fused together.

Furthermore, the present invention relates to moldings made from this composition, and further relates to various types of moldings which have been injection molded, blow molded, extrusion molded, vacuum molded, air pressure molded, or spun.

Of these, a stretch film obtained by at least uniaxially stretching and then heat treating at a temperature between 140 and 220° C. for 1 second or longer will provide a polylactic acid based stretch film characterized by having excellent surface smoothness, transparency, thermal resistance, gas barrier properties, and toughness.

These DSC measurements were taken after the first heating when the temperature was increased from 0° C. to 250° C. at a rate of 10° C./minute and held at 250° C. for 10 minutes, first cooled at a rate of 10° C./minute to a temperature of 0° C., and then second heated from 0° C. to 250° C.

Figure 1:
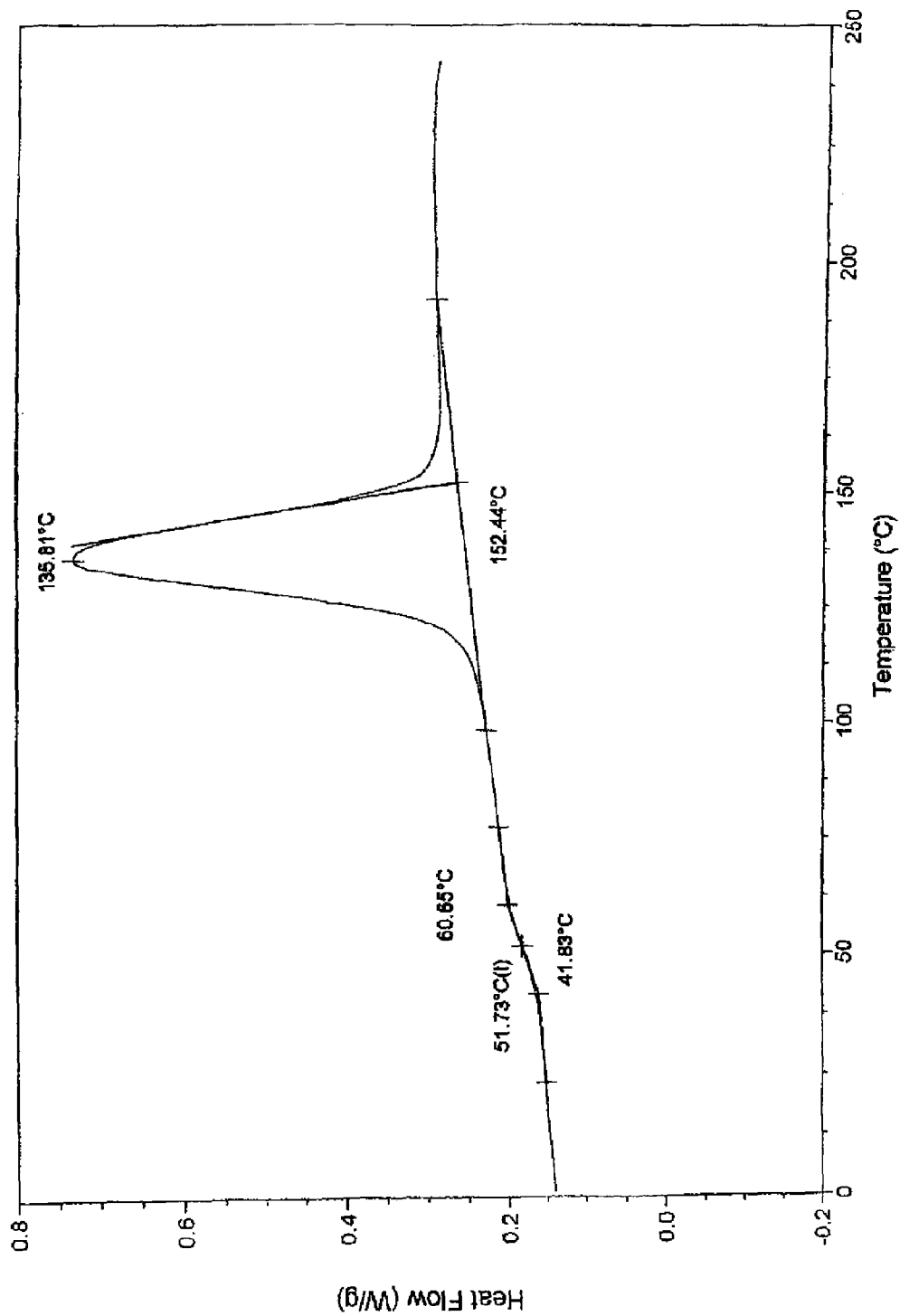
FIG. 1 is a diagram showing the first cooling DSC measurement chart of the polylactic acid based biaxial stretch obtained from embodiment 1.
Figure 2:
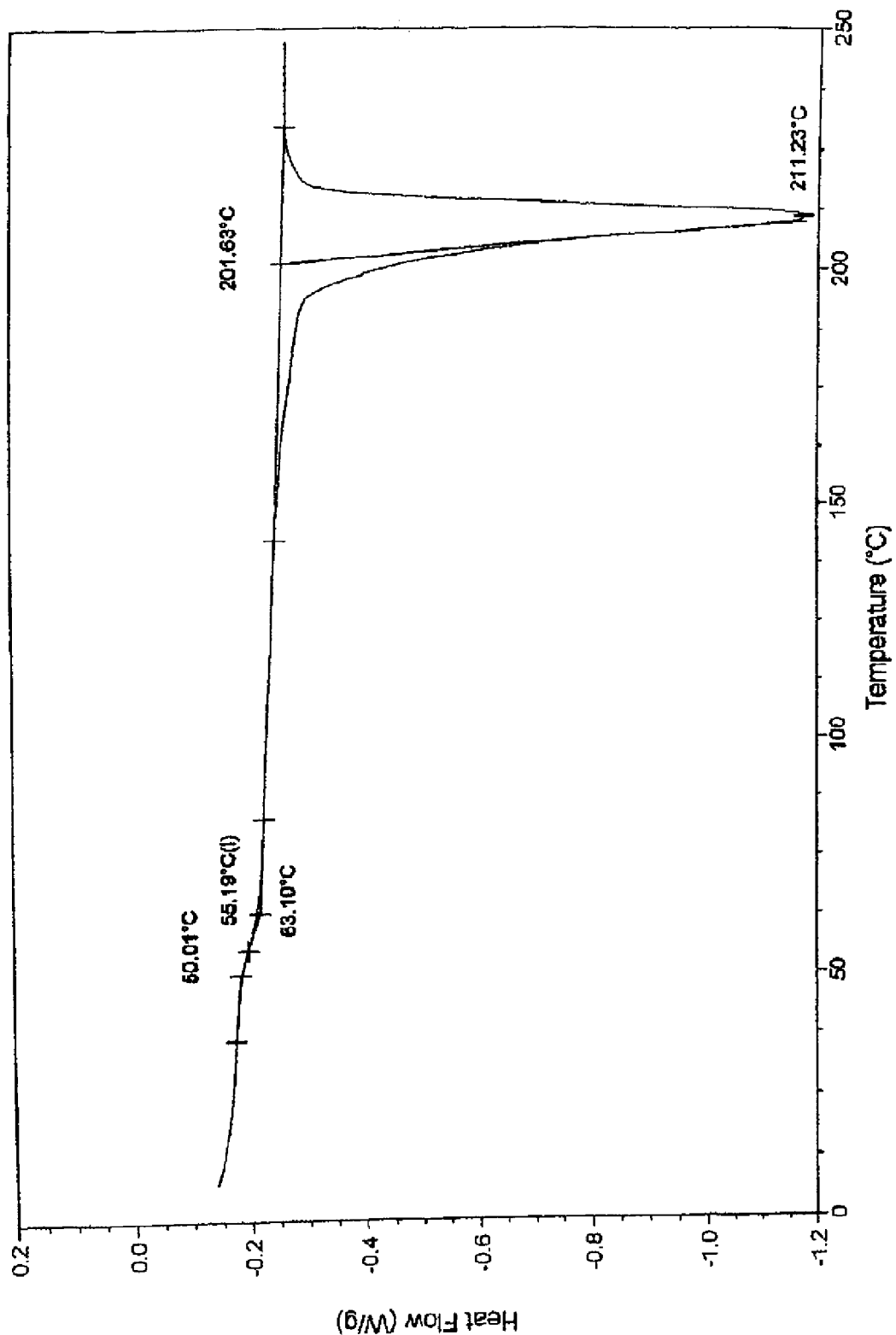
FIG. 2 is a diagram showing the second heating DSC measurement chart of the polylactic acid based biaxial stretch obtained from embodiment 1.
Figure 3:
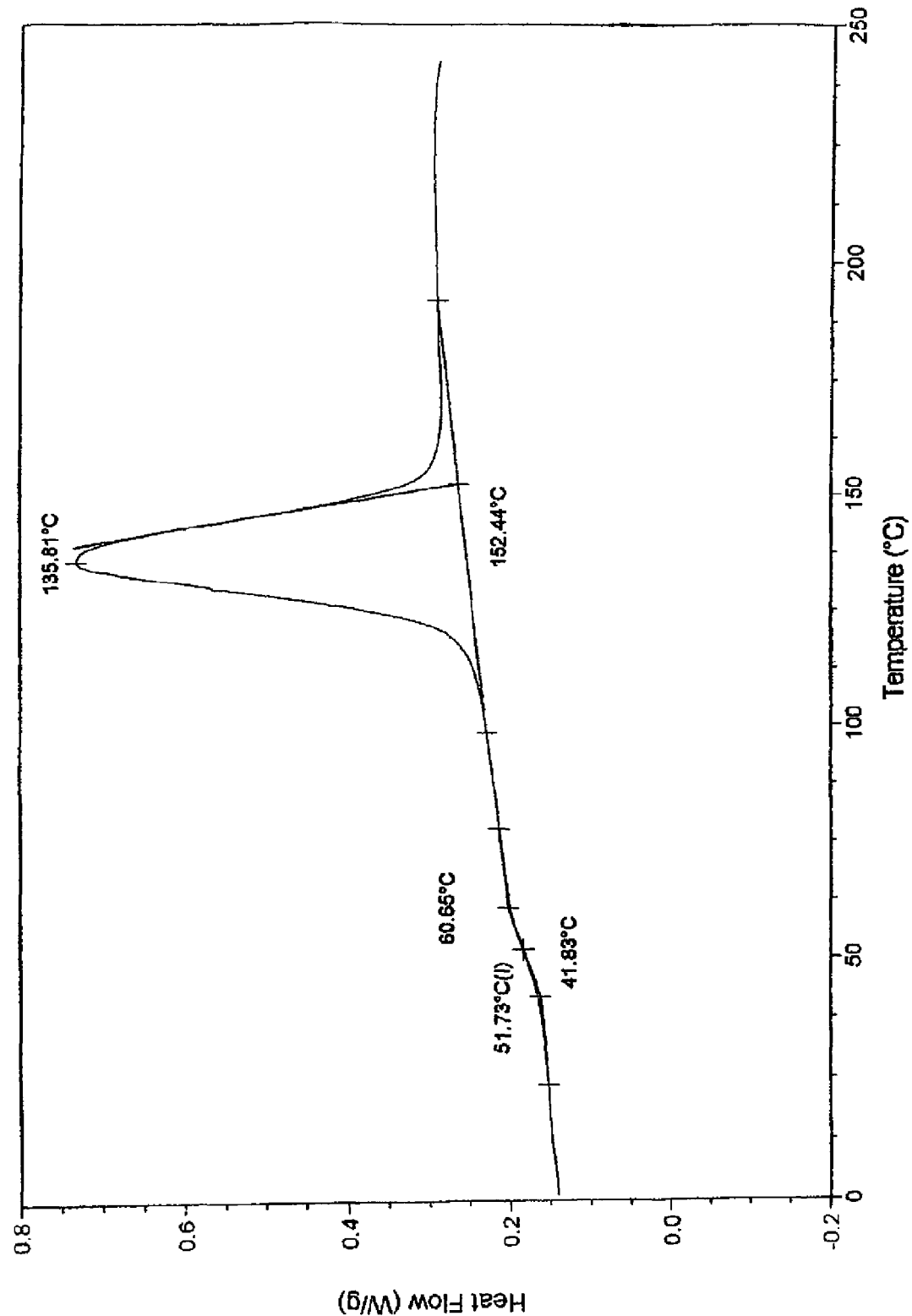
FIG. 3 is a diagram showing the first cooling DSC measurement chart of the polylactic acid based biaxial stretch obtained from embodiment 2.
Figure 4:
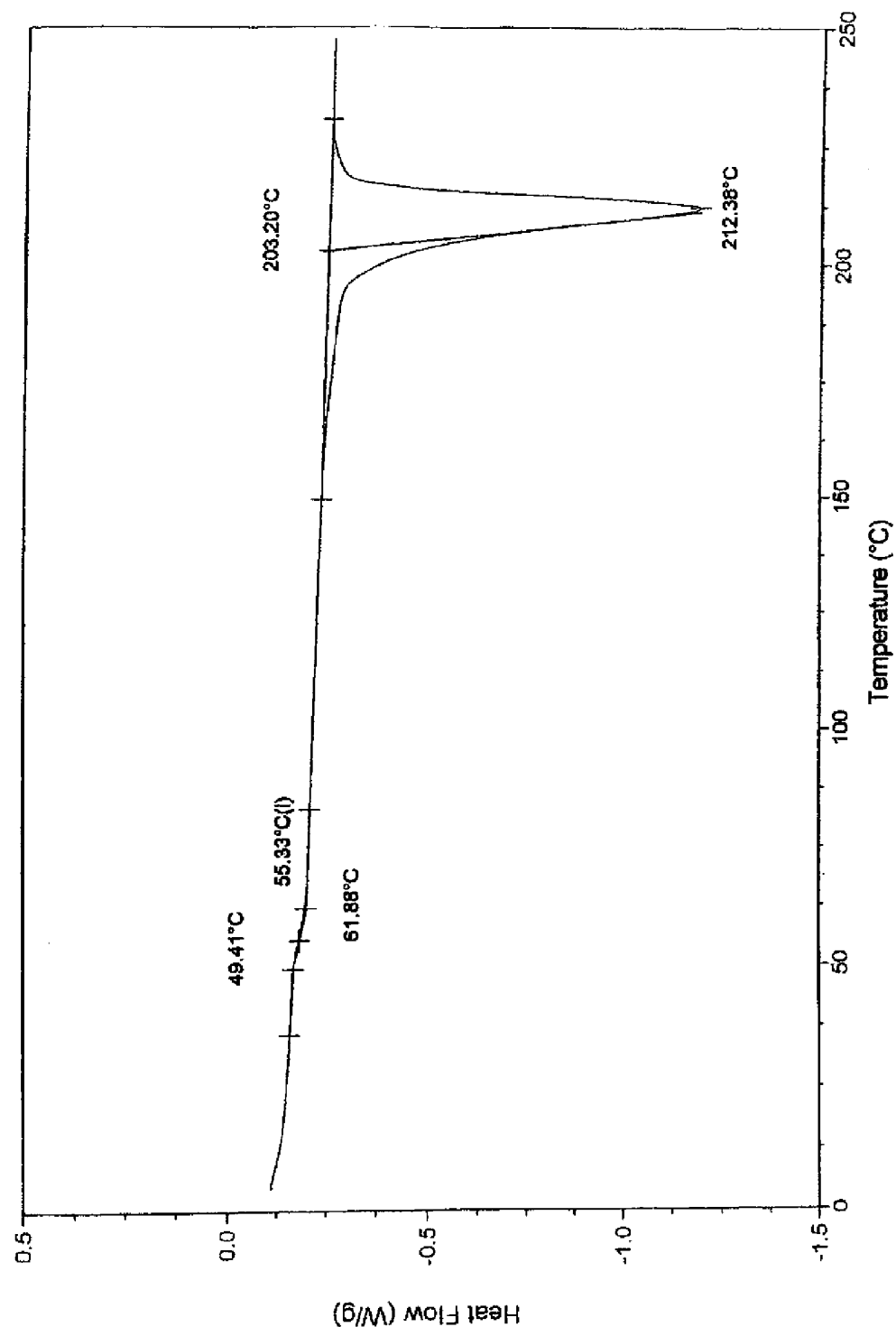
FIG. 4 is a diagram showing the second heating DSC measurement chart of the polylactic acid based biaxial stretch obtained from embodiment 2.
Figure 5:
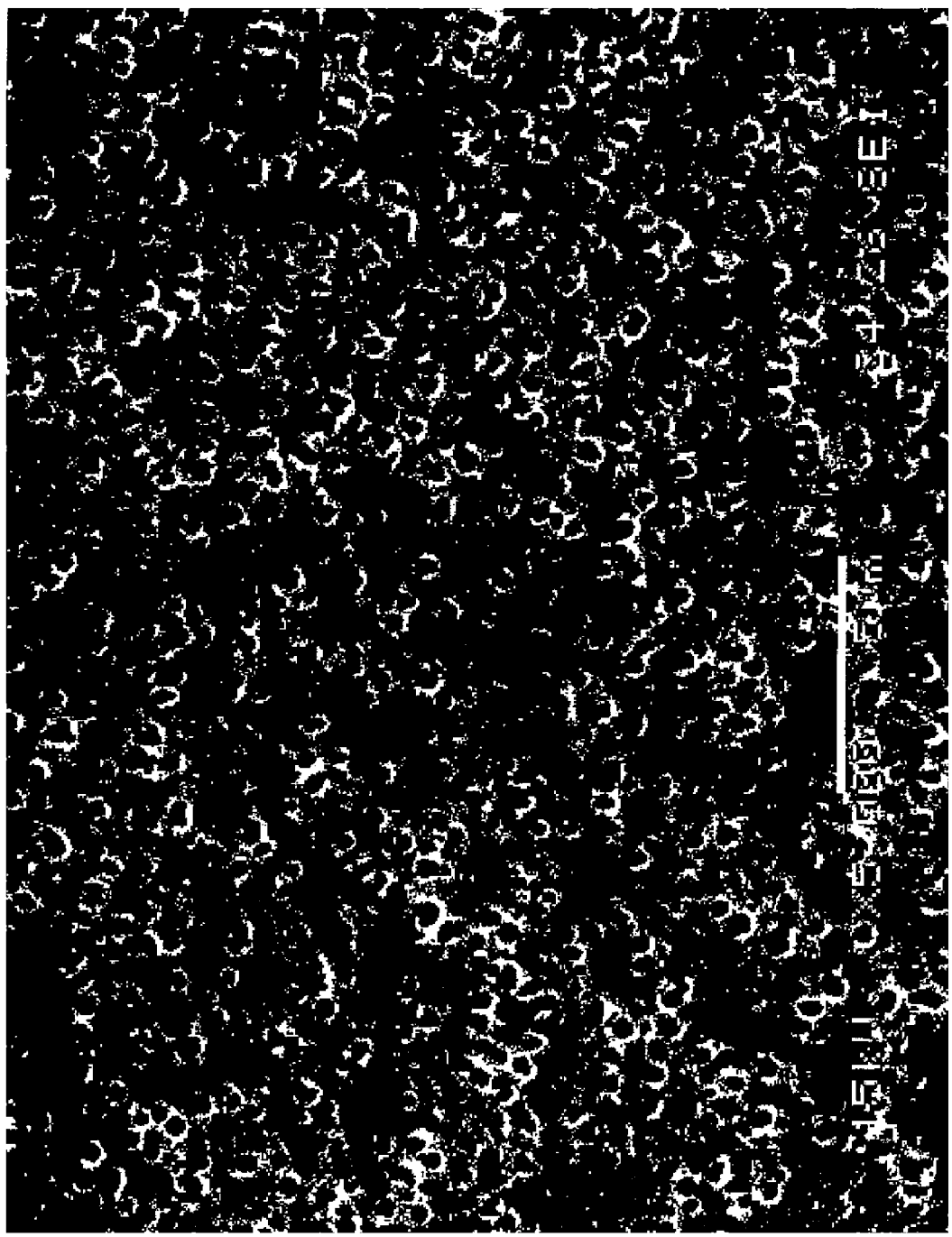
Figure 6:
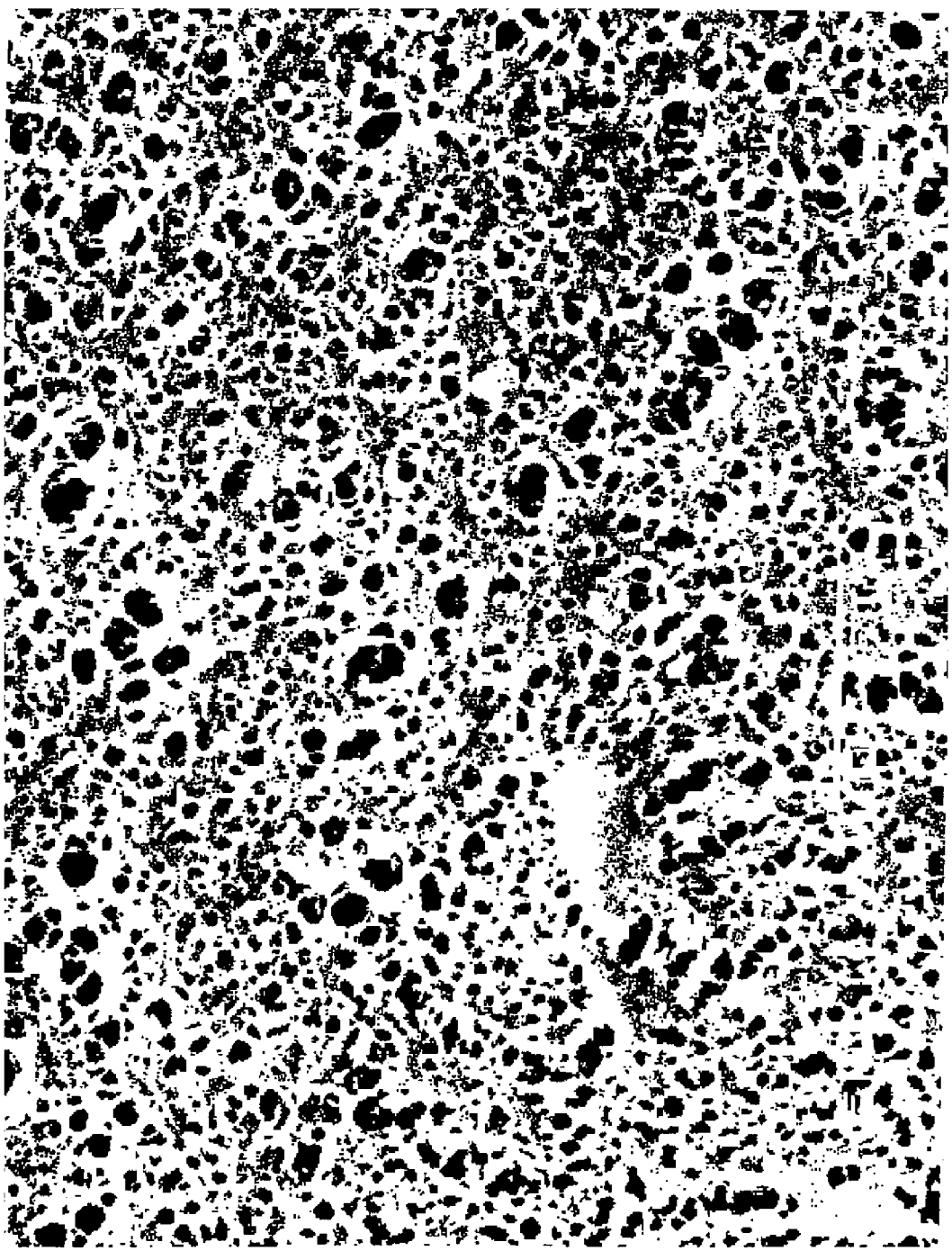
Figure 7:
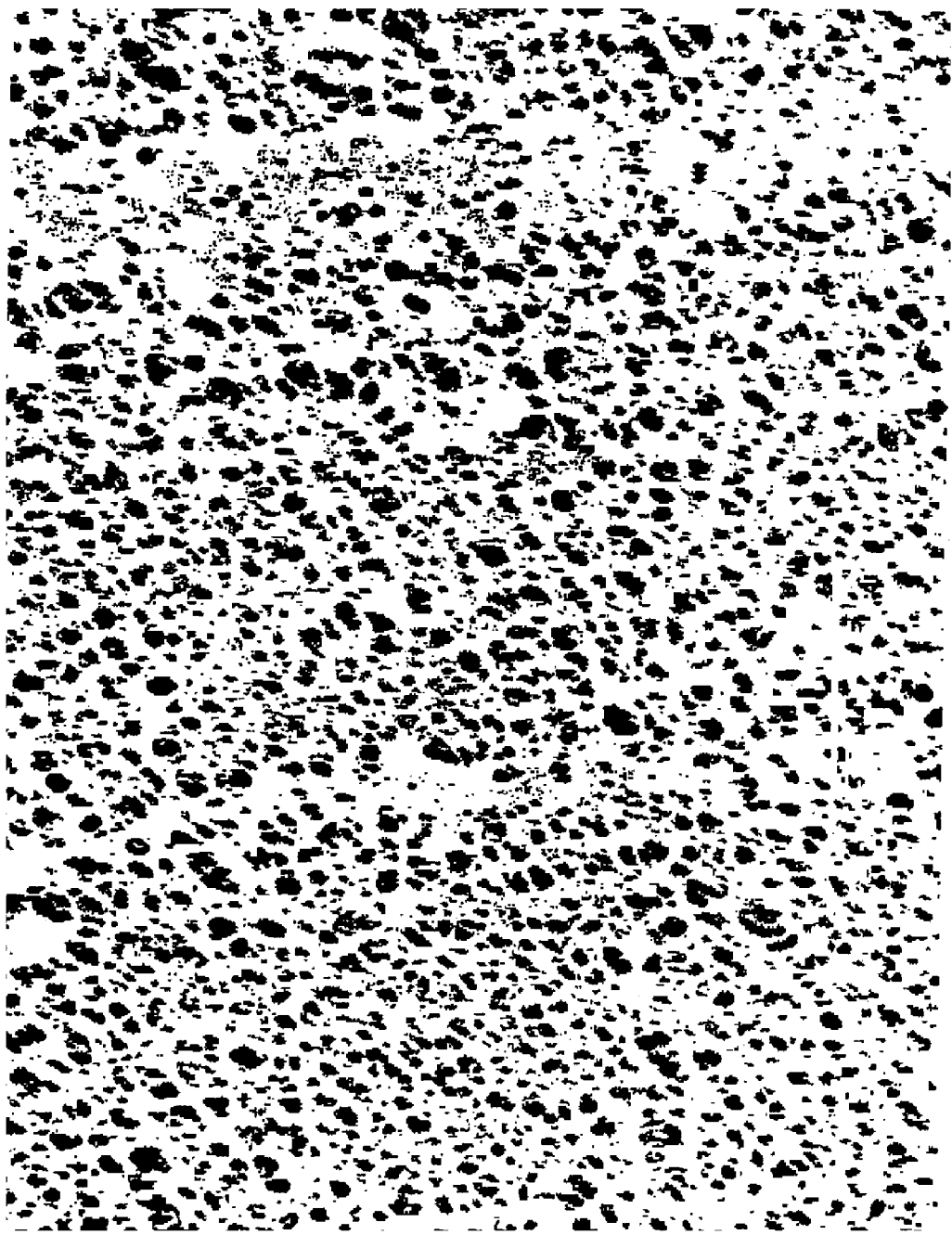
Figure 8:
Figure 9:
Figure 10:
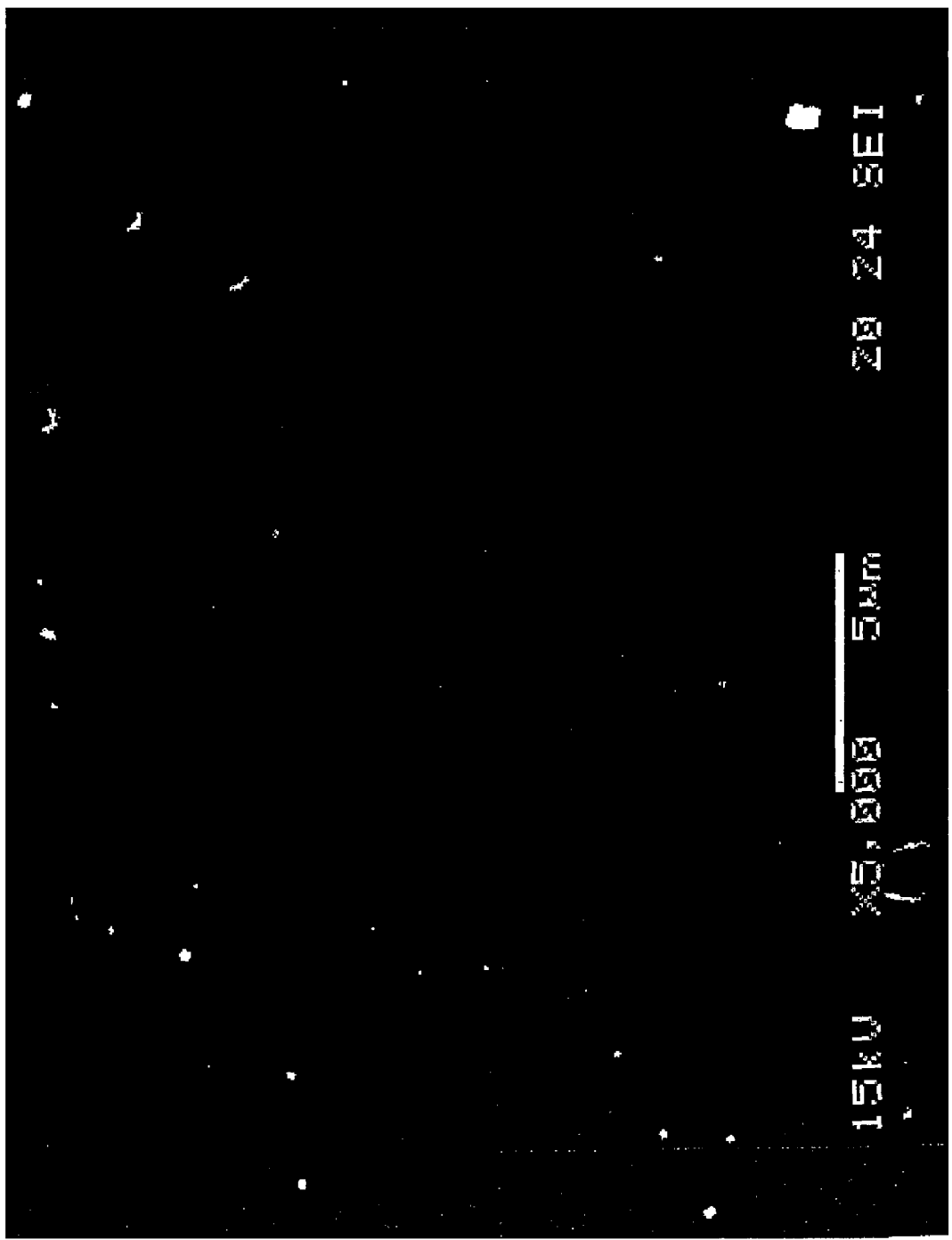
Figure 11:
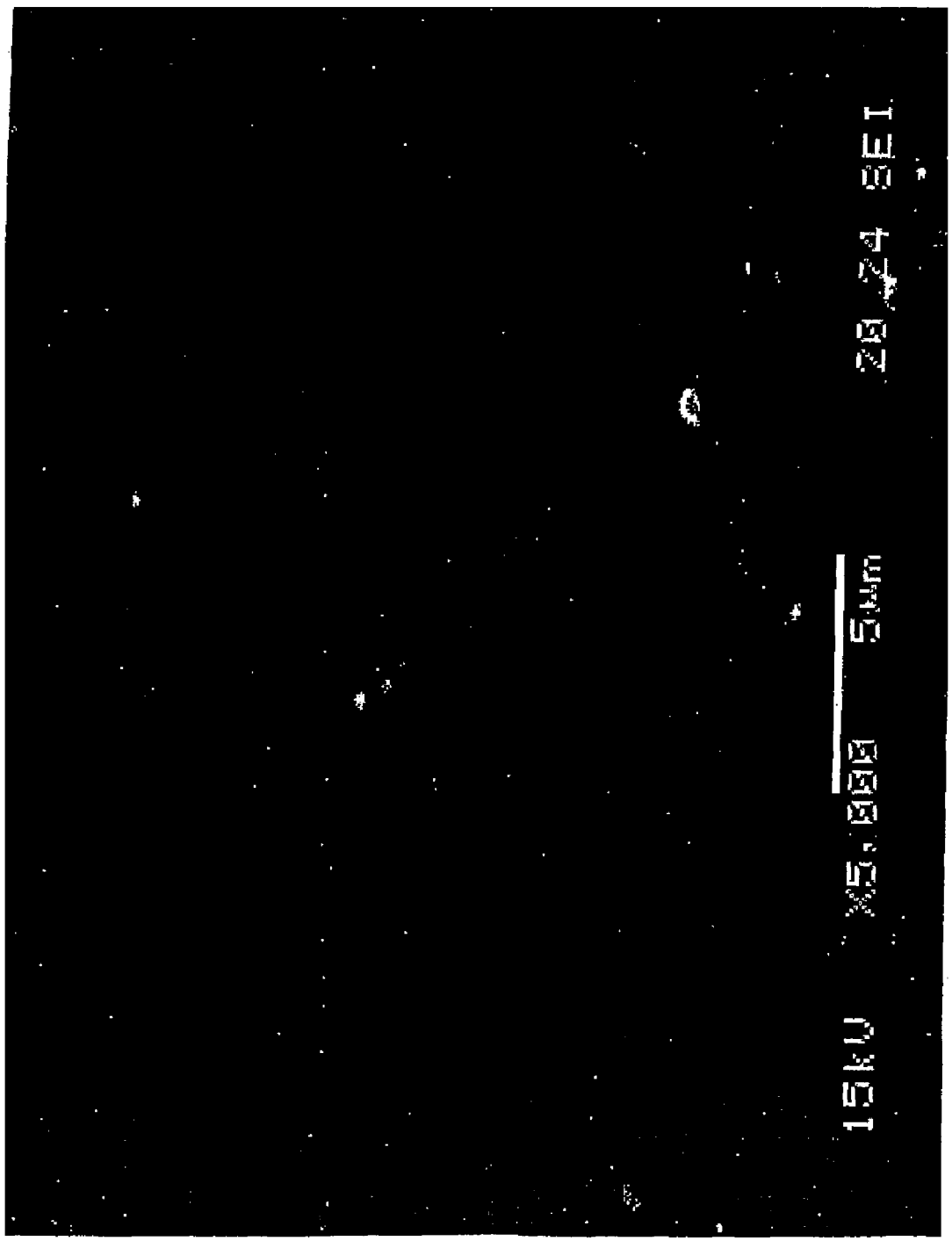
Figure 12:
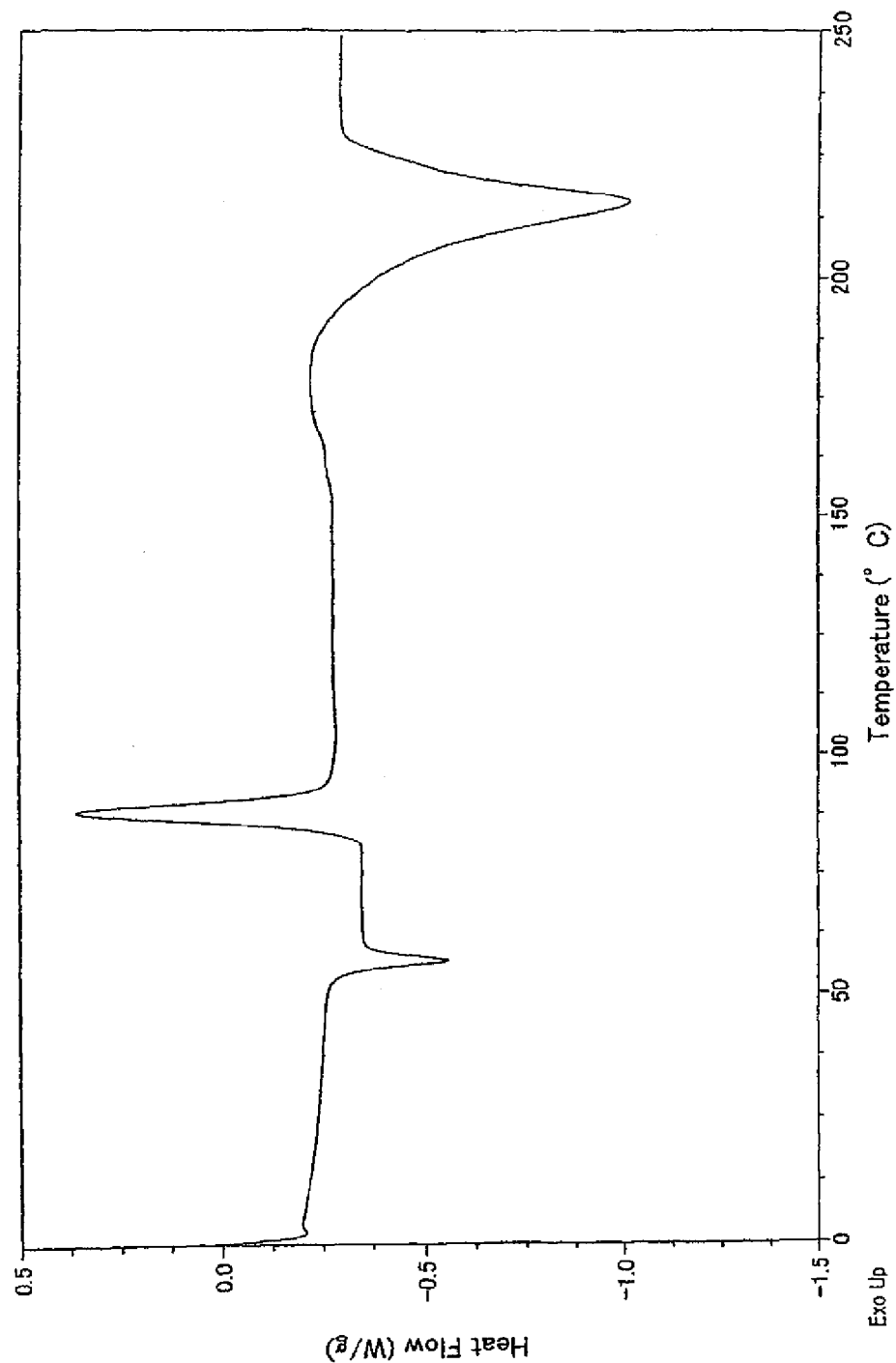
Figure 13:
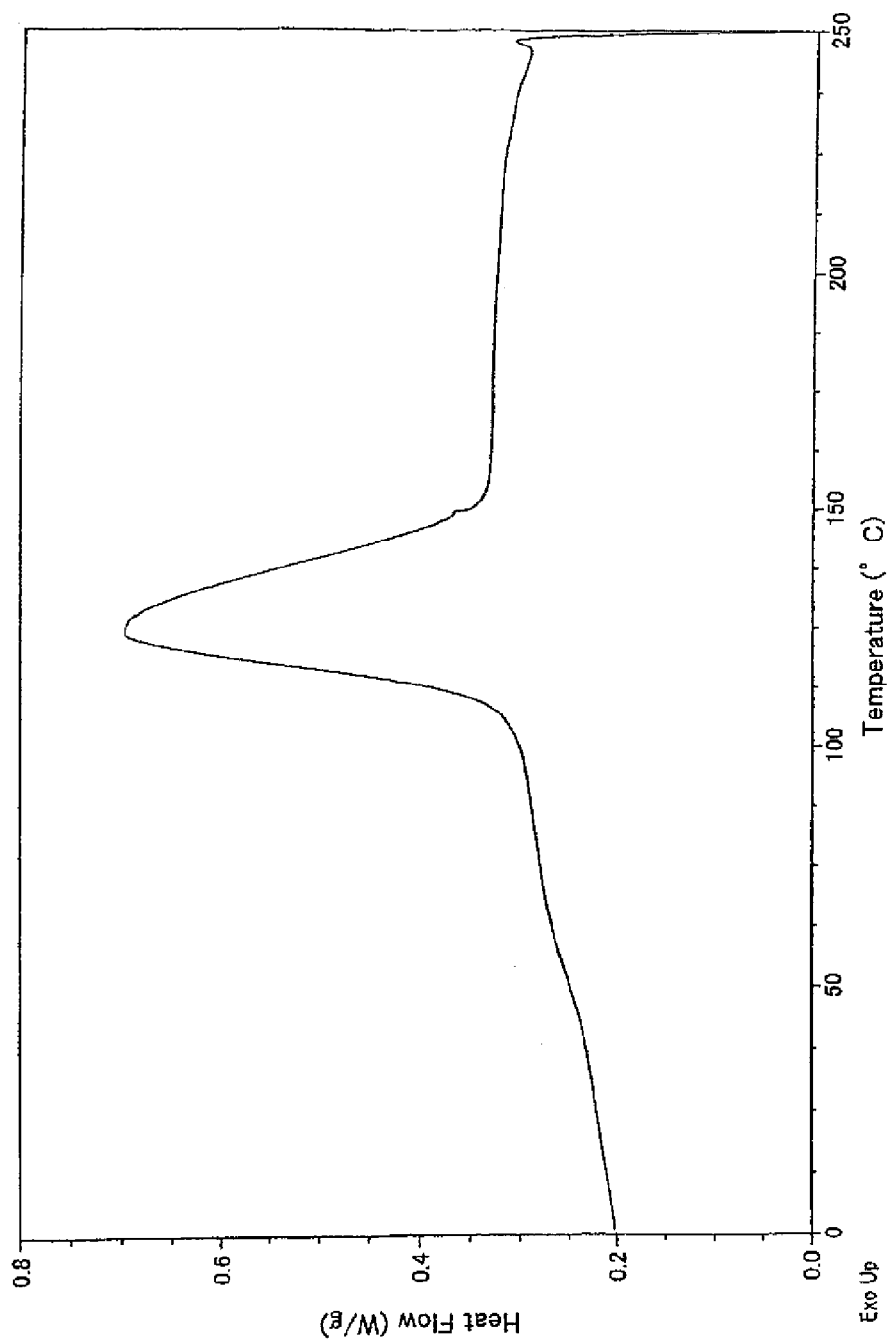
Figure 14:
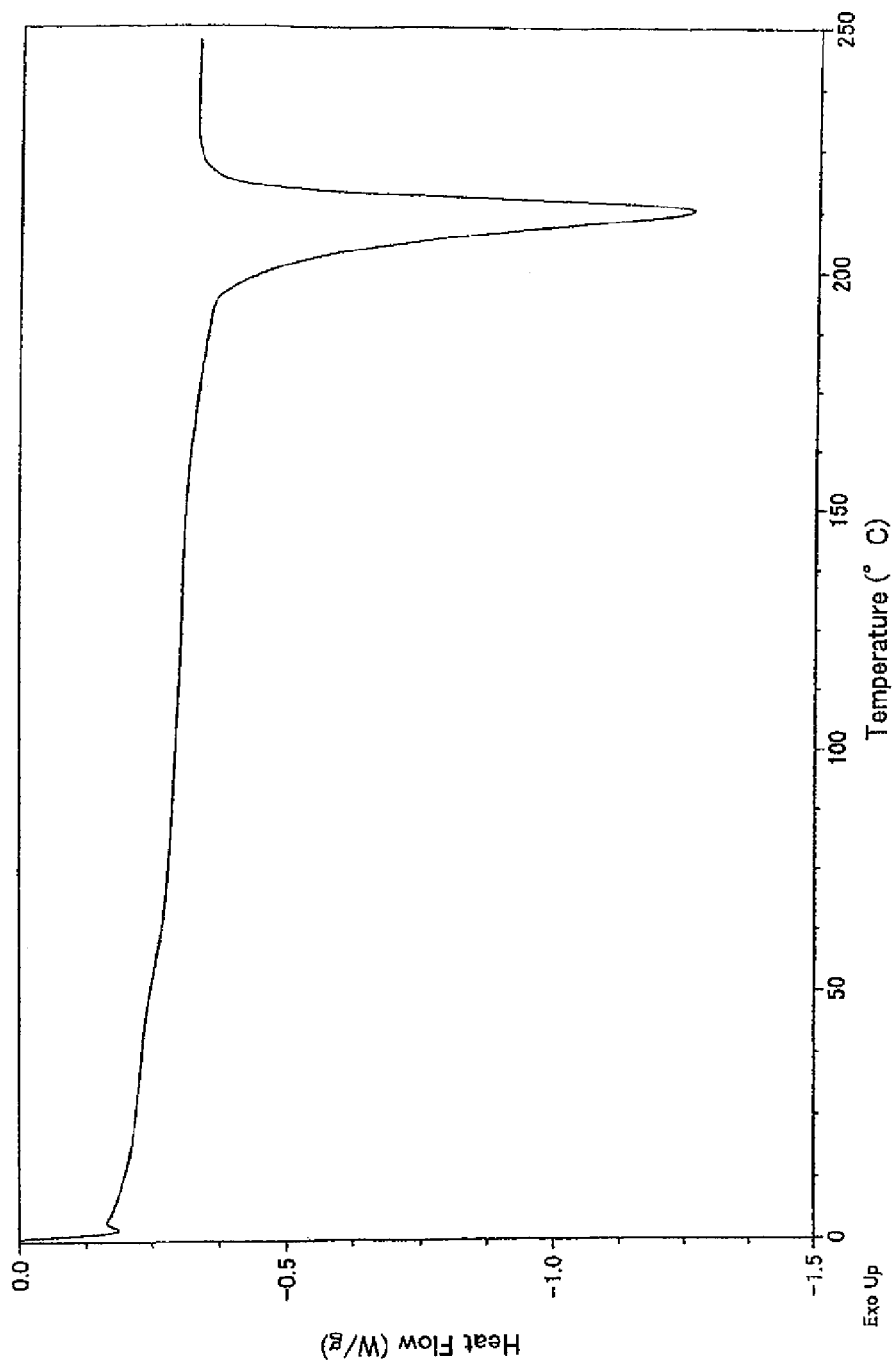
Figure 15:
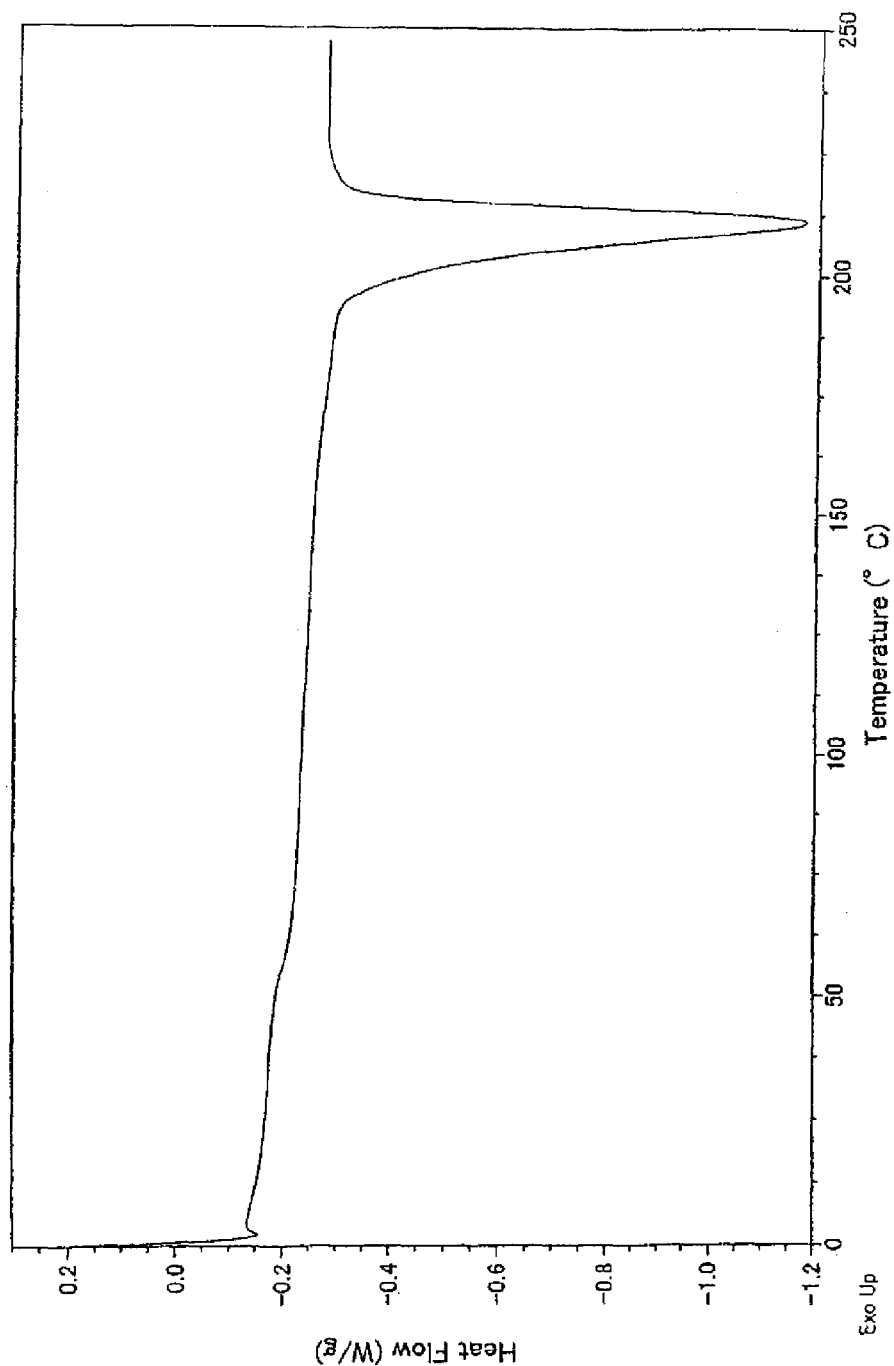
Figure 16:
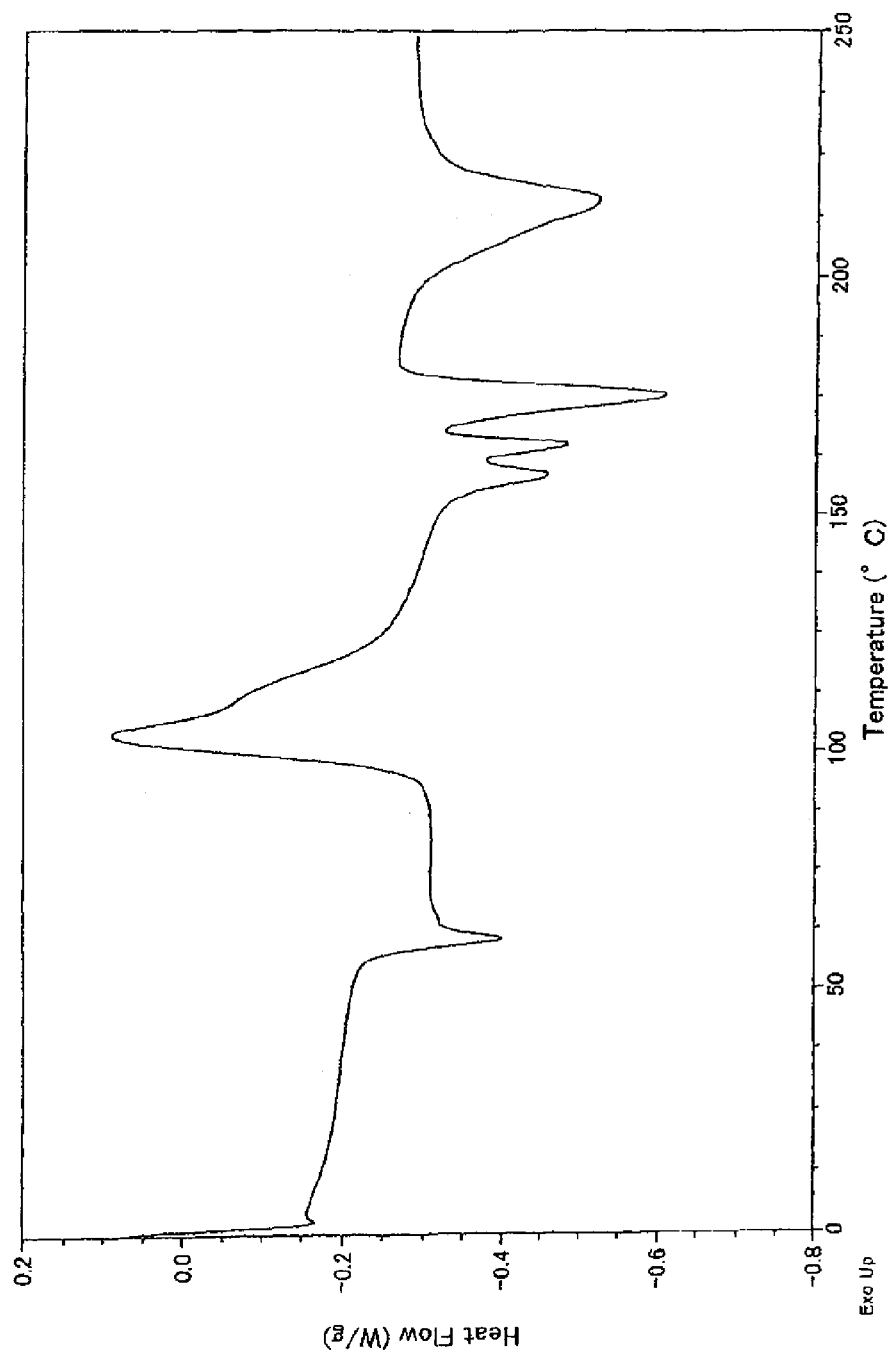
Figure 17:
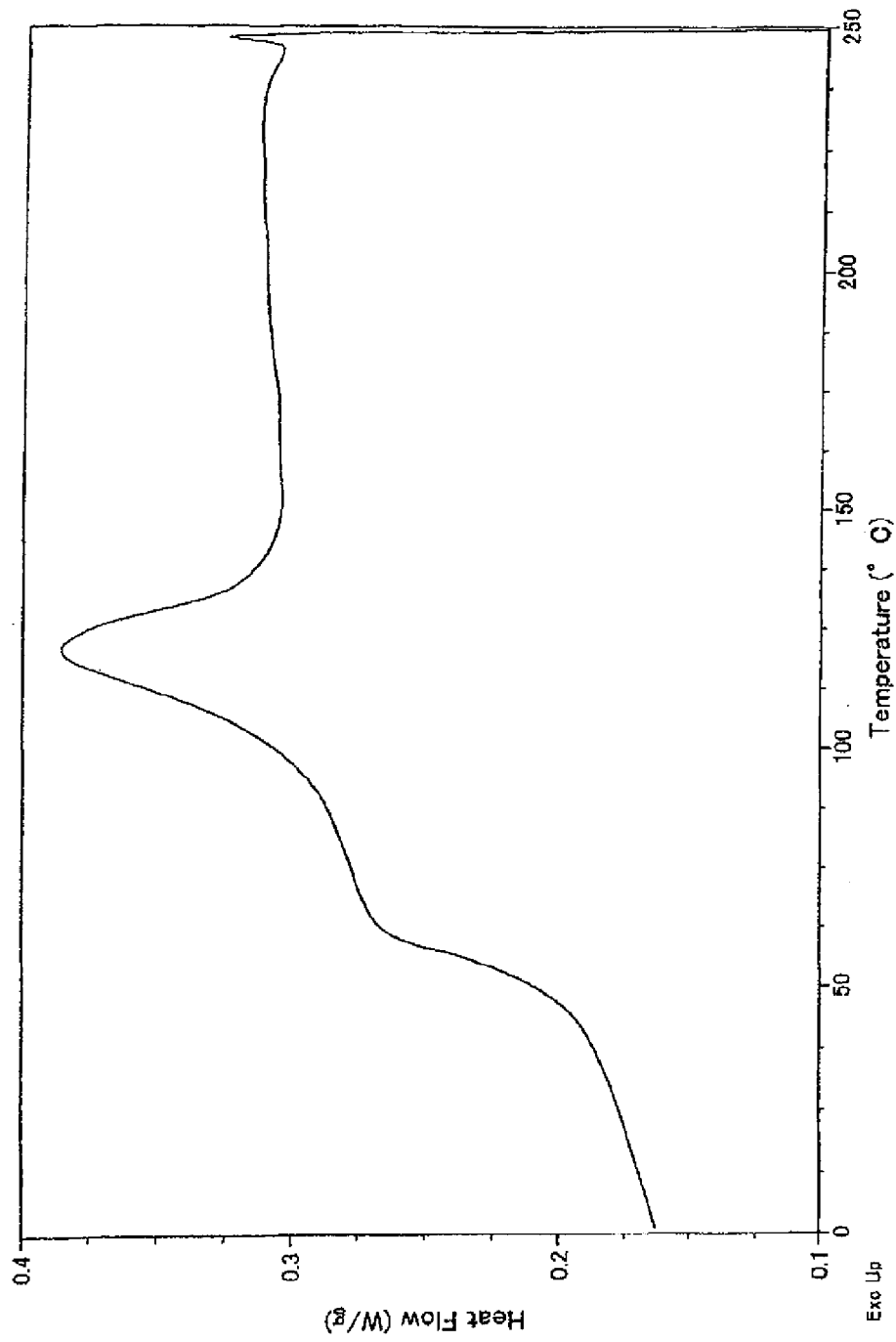
Figure 18:
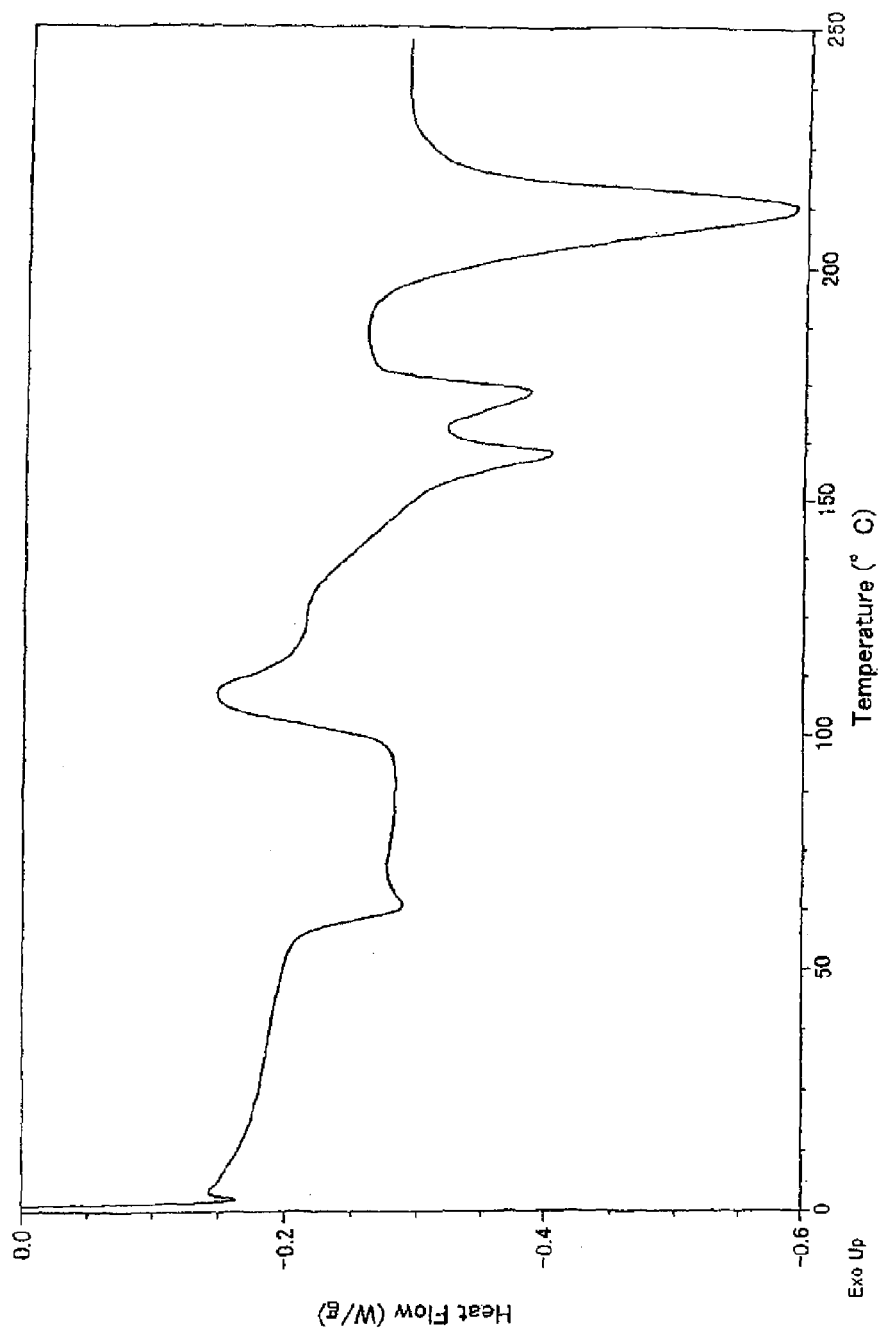
Figure 19:
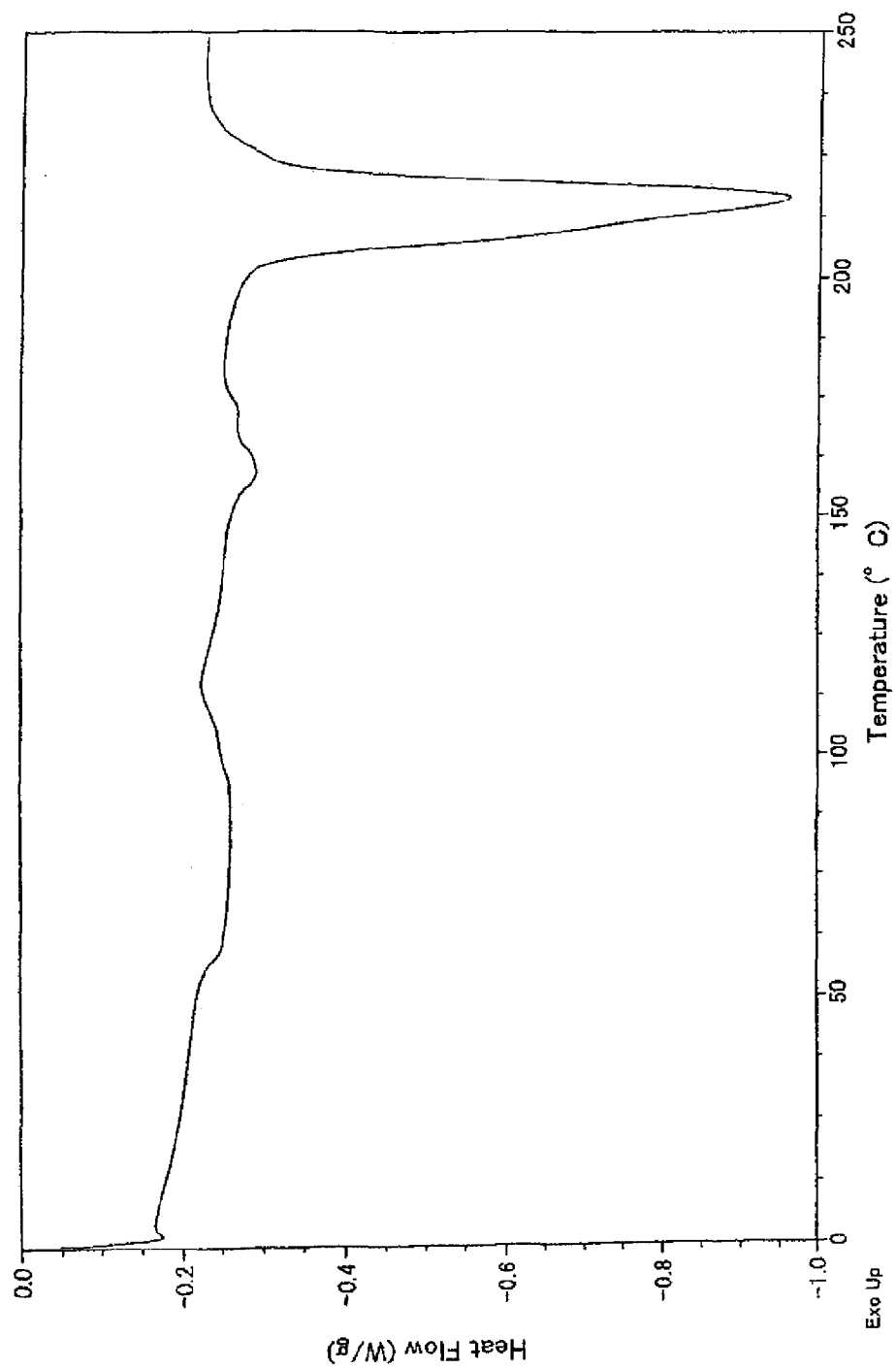

FIG. 5 shows a surface after 13 days of degradation by the enzyme disclosed in embodiment 7, using a scanning electron microscope (SEM);

FIG. 6 similarly shows the surface after 48 days of degradation by the enzyme disclosed in embodiment 7, using a scanning electron microscope (SEM);

FIG. 7 shows a surface after 48 days of degradation by the enzyme disclosed in embodiment 8, using a scanning electron microscope (SEM);

FIG. 8 shows the surface after 13 days of degradation by the enzyme disclosed in comparative example 4, using a scanning electron microscope (SEM);

FIG. 9 similarly shows the surface after 48 days of degradation by the enzyme disclosed in comparative example 4, using a scanning electron microscope (SEM);

FIG. 10 shows the surface after 13 days of degradation by the enzyme disclosed in reference example 4, using a scanning electron microscope (SEM);

FIG. 11 shows the surface after 13 days of degradation by the enzyme disclosed in reference example 5, using a scanning electron microscope (SEM);

FIG. 12 shows the DSC first heating measurement results for the press sheet disclosed in embodiment 17a;

FIG. 13 similarly shows the DSC first cooling measurement results for the press sheet disclosed in embodiment 17a;

FIG. 14 similarly shows the DSC second heating measurement results for the press sheet disclosed in embodiment 17a;

FIG. 15 similarly shows the DSC first heating measurement results for the stretch film disclosed in embodiment 17a;

FIG. 16 shows the DSC first heating measurement results for the press sheet disclosed in embodiment 17b;

FIG. 17 similarly shows the DSC first cooling measurement results for the press sheet disclosed in embodiment 17b;

FIG. 18 similarly shows the DSC second heating measurement results for the press sheet disclosed in embodiment 17b; and FIG. 19 similarly shows the DSC first heating measurement results for the stretch film disclosed in embodiment 17b.

EFFECT OF THE INVENTION

The composition of the present invention has specific thermal properties. These properties are thought to be a result of having a stereocomplex structure, and this structure can be selectively formed using the present invention. Furthermore, various types of moldings such as polylactic acid based stretch films and the like which have excellent thermal resistance, gas barrier properties, and toughness, as well as excellent surface smoothness and transparency can be obtained using this composition.

It is thought that a stereocomplex structure can selectively be formed by using the composition of the present invention when crystallizing from a noncrystalline state, and various types of moldings can be obtained which have excellent thermal resistance and for which crystallization is simple.

By using the present invention, a biodegradable polymer can be provided which has a relatively high molecular weight, and which can provide sufficient strength as a molding while also forming moldings with a high melting point and good thermal resistance.

BEST FORM FOR CARRYING OUT THE INVENTION

Poly-L-Lactic Acid

The poly-L-lactic acid (PLLA) of the present invention is a polymer with a composition primarily made of L-lactic acid, preferably containing no less than 95 mol %. If the polymer contains less than 95 mol % of L-lactic acid, the stretch film obtained by stretching a polylactic acid based composition obtained by melting and kneading with the later mentioned poly-D-lactic acid (PLDA) may have inferior thermal resistance and gas barrier properties, and other moldings may have inferior thermal resistance.

The molecular weight of the PLLA is not particularly restricted so long as the polylactic acid based composition when blended with the later mentioned poly-D-lactic acid has good forming properties as a film or the like, and normally the weight average molecular weight (Mw) is in a range between 6000 and 1,000,000. Poly-L-lactic acid with a weight average molecular weight between 6000 and 500,000 is preferable for the present invention. Note, in the field of films, stretch films obtained from compositions with a weight average molecular weight less than 60,000 may have inferior strength. On the other hand, if the weight average molecular weight exceeds 1,000,000, the melted viscosity will be high and there is a possibility that the forming and processing properties will be inferior.

Poly-D-Lactic Acid

The poly-D-lactic acid (PDLA) of the present invention is a polymer with a composition primarily made of D-lactic acid, preferably containing no less than 95 mol %. If the polymer contains less than 95 mol % of D-lactic acid, a stretch film obtained by stretching a polylactic acid based composition obtained by melting and kneading with the aforementioned poly-L-lactic acid, as well as other types of moldings, may have inferior thermal resistance.

The molecular weight of the PDLA is not particularly restricted so long as the polylactic acid based composition when blended with the aforementioned PLLA has good film forming properties, and normally the weight average molecular weight (Mw) is in a range between 6000 and 1,000,000. Poly-D-lactic acid with a weight average molecular weight between 6000 and 500,000 is preferable for the present invention Note, in the field of films, stretch films obtained from compositions with a weight average molecular weight less than 60,000 may have inferior strength. On the other hand, if the weight average molecular weight exceeds 1,000,000, the melted viscosity will be high and there is a possibility that the forming and processing properties will be inferior.

Small amounts of other copolymer components such as polyacid carboxylic acids or esters thereof, polyhydric alcohols, hydroxycarboxylic acid, and lactones or the like can be copolymerized with the PLLA and PDLA of the present invention to the extent that the object of the present invention is not hindered.

Specific examples of the polyacid carboxylic acids include aliphatic dicarboxylic acids such as succinic acid, glutaric acid, adipic acid, pimelic acid, azelaic acid, suberic acid, decanedicarboxylic acid, dodecanedicarboxylic acid, sebacic acid, diglycolic acid, ketopimelic acid, malonic acid, and methylmalonic acid, as well as aromatic dicarboxylic acids such as terephthalic acid, isophthalic acid, and 2,6-naphthalenedicarboxylic acid and the like.

Specific examples of poly-acid carboxylate esters include aliphatic dicarboxylic esters such as dimethyl succinate, diethyl succinate, dimethyl glutarate, diethyl glutarate, dimethyl adipate, diethyl adipate, dimethyl pimelate, dimethyl azelate, dimethyl subarate, diethyl subarate, dimethyl sebacate, diethyl sebacate, dimethyl decanedicarboxylate, dimethyl dodecanedicarboxylate, dimethyl diglycolate, dimethyl ketopimelate, dimethyl malonate and dimethyl methylmalonate, and aromatic dicarboxylic esters such as dimethyl terephthalate, and dimethyl isophthalate and the like.

Specific examples of polyhydric alcohols include ethylene glycol, 1,3-propanediol, 1,2-propanediol, 1,3-butanediol, 2-methyl-propanediol, 1,4-butanediol, neopentyl glycol, pentamethylene glycol, hexamethylene glycol, octamethylene glycol, decamethylene glycol, dodecamethylene glycol, 1,4-cyclohexanediol, 1,4-cyclohexanedimethanol, diethylene glycol, dipropylene glycol, triethylene glycol, tetraethylene glycol, pentaethylene glycol, and other polyethylene glycol with a molecular weight of 1000 or less.

Specific examples of hydroxycarboxylic acids include glycolic acid, 2-methyl lactic acid, 3-hydroxybutyric acid, 4-hydroxybyutric acid 2-hydroxy-n-butyric acid, 2-hydroxy-3,3-dimethylbyutric acid, 2-hydroxy-2-methylbutyric acid, 2-hydroxy-3-methylbutyric acid, hydroxypivalic acid, hydroxyisocaproic acid, hydroxycaproic acid, and the like.

Specific examples of lactones include β-propiolactone, β-butyrolactone, γ-butyrolactone, β or γ-valerolactone, δ-valerolactone, δ-caprolactone, ε-caprolactone, 4-methylcaprolactone, 3,5,5-trimethylcaprolactone, 3,3,5-trimethylcaprolactone and other various types of methylated caprolactones; β-methyl-δ-valerolactone, enantholactone, laurolactone, and other cyclic monomer esters of hydroxycarboxylic acids; glycolid, L-lactid D-lactid and other cyclic dimer esters of the aforementioned hydroxycarboxylic acids and the like.

Furthermore, the PLLA and PDLA of the present invention may also include small quantities of D-lactic acid or L-lactic acid if the amount is less than the aforementioned range.

Polylactic Acid Composition

The polylactic acid composition of the present invention is characterized in that when measured by DSC, the cooling (10° C./minute) peak after 10 minutes at 250° C. is no less than 30 mJ/mg, preferably no less than 45 mJ/mg, and particularly preferably no less than 50 mJ/mg.

Furthermore, when measured during the second DSC heating (cooling at a rate of 10° C./minute after 10 minutes at 250° C., and heating again from 0° C. at a rate of 10° C./minute), a suitable composition of the present invention preferably has thermal properties such that the peak ratio (peak 1/peak 2) of the peak when Tm=150 to 180° C. (peak 1) and the peak when Tm=200 to 240° C. (peak 2) is 0.5 or less, preferably 0.3 or less, and even more preferably 0.2 or less. This is thought to be because this composition selectively forms stereocomplex crystals.

If the peak ratio (peak 1/peak 2) is greater than 0.5, the amount of PLLA and PDLA monoisomer crystals formed after crystallization will be high, and there is a possibility that the aforementioned kneading will be insufficient.

Furthermore, moldings made from a composition where the peak ratio (peak 1/peak 2) is greater than 0.5 may have inferior thermal properties because of the increased amount of α crystals (PLLA or PDLA individual crystals) formed after crystallization.

Furthermore, the present invention provides a polylactic acid composition characterized in that when measured during the DSC second heating (cooling at a rate of 10° C./minute after 10 minutes at 250° C., and heating again from 0° C. at a rate of 10° C./minute), the peak when Tm is between 200 and 240° C. (peak 2) is no less than 35 mJ/mg.

These poly-lactic acid compositions are preferably composed of, or in other words are prepared from between 25 and 75 weight parts, preferably between 35 and 65 weight parts, more preferably between 45 and 55 weight parts, and most preferably between 47 and 53 weight parts of the aforementioned PLLA and between 75 and 25 weight parts, preferably between 65 and 35 weight parts, more preferably between 55 and 45 weight parts, and most preferably between 53 and 47 weight parts of PDLA (PLLA+PDLA=100 weight parts).

With these compositions, the composition is preferably prepared by kneading poly-L-lactic acid and poly-D-lactic acid where the weight average molecular weight of the poly-L-lactic acid and the poly-D-lactic acid is in a range between 6000 and 500,000, and the weight average molecular weight of at least one of either the poly-L-lactic acid or the poly-D-lactic acid is between 30,000 and 500,000.

Furthermore, the polylactic acid based composition of the present invention can be obtained for example by melting and kneading the PLLA and PDLA at between 230 and 260° C. using a twin screw extruder, twin screw kneader, Banbury mixer, or blastmill or the like.

The amount of PLLA should be between 75 and 25 weight parts, and particularly between 65 and 35 weight parts, but there is a possibility that the thermal properties of a composition obtained within this range will be insufficient even though a composition where the amount of PLLA exceeds 55 weight parts or a composition where the amount of PLLA is less than 45 weight parts is kneaded by the aforementioned method. Moldings made from the composition obtained will include α crystal crystalline substances, and there is a possibility that the thermal properties will be insufficient. This is thought to be because the stereocomplex structure contains equal quantities of PLLA and PDLA.

On the other hand, the temperature when the PLLA and PDLA is melted and kneaded is preferably between 230 and 260° C., more preferably between 235 and 255° C. If the temperature of melting and kneading is below 230° C., there is a possibility that the stereocomplex structure will exist in an unmelted state, but if the temperature exceeds 260° C., there is a possibility that the polylactic acid will degrade.

Furthermore, when preparing the polylactic acid based composition of the present invention, it is preferable that the PLLA and PDLA be sufficiently melted and kneaded.

The composition of the present invention rapidly crystallizes into a stereocomplex, and the possible range of the stereocomplex crystals is large, so it is thought that formation of individual crystals (α crystals) of either PLLA or PDLA is difficult.

Furthermore, when measured by DSC during cooling (10° C./minute) after setting at 250° C. for 10 minutes, the polylactic acid composition of the present invention will have a peak due to crystallization that is no less than 30 mJ/mg, preferably no less than 45 mJ/mg, and particularly preferably no less than 50 mJ/mg, and crystallization of the polylactic acid based composition will occur rapidly.

Furthermore, if the peak due to crystallization is smaller than 30 mJ/mg, the crystallization speed will be low and there is a possibility that the aforementioned kneading will be insufficient.

Furthermore, if a molding is made from a composition where the peak due to crystallization, when measured by DSC during cooling (10° C./minute) after 10 minutes at 250° C., is smaller than 30 mJ/mg, and also if smaller than 45 mJ/mg depending on the field of the moldings, the molding will have a low crystallization speed, and formation of crystalline material after crystallization of the molding will be minimal, so there is a possibility that the thermal resistance will be poor.

DSC measurements for the present invention are taken while heating or cooling at a rate of 10° C./minute. Note, the heat of crystallization (measured value) will generally be larger as the rate of heating or cooling is decreased. For example, the value for the test sample of Embodiment 17a was 61.7 J/g during the first cooling (at a cooling rate of 10° C./minute), but when measured at a cooling rate of 5° C./minute, the value was 70.6 J/g. When comparing the heat of crystallization (measured value) by DSC, measured values taken at the same rate of heating or cooling must be compared.

The weight average molecular weight of the polylactic acid based composition of the present invention is not particularly restricted, but the weight average molecular weight of the composition of the present invention is preferably in a range between 10,000 and 300,000. Furthermore, in the field of films, the weight average molecular weight is preferably in a range between 100,000 and 150,000. If the aforementioned range is violated to the large molecule side, the stereocomplex will not be sufficiently formed and there is a possibility that thermal resistance will not be achieved, but if the range is violated to the small molecule side, there is a possibility that the strength of the film obtained will not be sufficient.

Furthermore, the method of preparing the composition of the present invention is preferably a method of melting and kneading such that the weight average molecular weight of the composition obtained will be in a range between 0.3 and 0.6 times, more preferably in a range between 0.4 and 0.6 times the value for the weight average molecular weight obtained by taking the weighted average of each of the weight average molecular weights of the poly-L-lactic acid and poly-D-lactic acid to be used. Therefore, the poly-L-lactic acid and the poly-D-lactic acid in the composition obtained according to the present invention will be very finely fused together. For example, if the weight average molecular weight of the poly-D-lactic acid is larger than the weight average molecular weight of the poly-L-lactic acid, and if poly-L-lactic acid with the weight average molecular weight between 150,000 and 200,000 and poly-D-lactic acid with a weight average molecular weight between 200,000 and 350,000 are used in a weight ratio where poly-L-lactic acid/poly-D-lactic acid is between 45/55 and 55/45, the composition obtained by kneading these materials, and more preferably by kneading with a twin screw extruder or a twin screw kneader will be in a state where the poly-L-lactic acid and poly-D-lactic acid are finely fused as shown below.

In other words, if a press sheet obtained by pressing said composition at a temperature between 240 and 260° C. and then rapid cooling at a temperature between 0 and 30° C. is observed using a scanning electron microscope (SEM) after 48 days after the poly-L-lactic acid is broken down and removed from the press sheet using an enzyme that breaks down poly-L-lactic acid, fine holes will be formed, but holes with a diameter of 5 μm or larger will not observed. These fine holes normally have a diameter between approximately 0.1 and 3 μm, which is made clear by the fact that between 20 and 200 holes are present in a 5 μm×5 μm area. This is because degradation and elimination by enzymes is difficult because the regions consisting of poly-L-lactic acid monoisomer are either nonexistent or are extremely sparse.

Polylactic Acid Crystal Nucleating Agent

Furthermore, as described above the polylactic acid composition of the present invention has excellent crystallization promoting properties, and functions as a crystal nucleating agent for polylactic acid based polymers. Therefore, a composition made by melting and kneading between 1 and 90 weight parts of the polylactic acid crystal nucleating agent made from the polylactic acid based composition of the present invention with between 99 and 10 weight parts of either poly-L-lactic acid or poly-D-lactic acid will have accelerated crystallization, and will therefore be suitable as a raw material for various types of moldings. If the amount of polylactic acid crystal nucleating agent consisting of the polylactic acid composition is less than 1 weight part, there is a possibility that the function as a crystal nucleating agent will be insufficient.

Furthermore, when the polylactic acid based composition of the present invention is used as a crystal nucleating agent, between 1 and 90 weight parts of the polylactic acid based composition may first be prepared under the aforementioned conditions, and then melted and kneaded with between 99 and 10 weight parts of either poly-L-lactic acid or poly-D-lactic acid.

Polylactic Acid Based Stretch Film

The polylactic acid based stretch film of the present invention is made from the aforementioned polylactic acid based composition, and after heat treatment, has wide angle x-ray diffraction peaks (2θ) in the vicinity of 12°, in the vicinity of 21°, and in the vicinity of 24° (SSC), and the area (SSC) of these diffraction peaks is no less than 90% with respect to the sum (total area) of the area (SSC) of these diffraction peaks and the area (SPL) of a diffraction peak in the vicinity of 16° ({SSC/(SSC+SPL)}×100). The wide angle x-ray diffraction peak in the vicinity of 16° (PPL) is a peak based on PLLA and PDLA crystals, and the peaks in the vicinity of 12°, in the vicinity of 21°, and in the vicinity of 24° are peaks (PSC) based on so-called stereocomplex crystals which are eutectoid crystals of PLLA and PDLA.

In other words, the stretch film is made from a polylactic acid composition where the PLLA and PDLA have been uniformly melted and kneaded, so either a polylactic acid crystals (a crystals) have not formed, or are formed in small quantities, and it is thought that most of the material is formed in a stereocomplex structure.

With the polylactic acid based composition of the present invention, the PLLA and PDLA are sufficiently melted and kneaded to make a uniform construction, so the stretch film obtained will have excellent surface smoothness and transparency, the stretching behavior when heated will be consistent, and the properties of the stereocomplex structure which has a melting point in the vicinity of 230° C. will be effective so the composition will have excellent thermal resistance.

In other words, in a thermal deformation test using thermomechanical analysis, the deformation at 200° C. will be no greater than 10%, and of course melting will not occur at 200° C.

Furthermore, the stereocomplex construction will be formed without melting the PLLA and PDLA crystals (a crystals), so the oriented condition will be maintained even after heat treatment, and therefore the film will have excellent toughness and the elongation in the direction of stretching will be 10% or greater, while the breaking energy in the direction of stretching will be no less than 0.1 mJ.

Note, with the present invention, the wide angle x-ray diffraction peak (2θ) is the angle (°) of the diffraction peak detected by an x-ray diffraction device (automated x-ray diffraction device RINT-2200 produced by Rigaku Corporation) by irradiating a sheet or film as the x-ray target using Cu K-α, and an output of ¹/₄₀ kV×40 mA, and then measuring at angular rotation: 4.0/minute, step: 0.02°, and scanning range: 10 to 30°.

Furthermore, the area of each of the diffraction peaks was calculated by cutting out the areas of the analysis peak in the vicinity of 16° (2θ) for (SPL) and the analysis peaks (2θ) in the vicinity of 12°, 21°, and 24° for (SSC), and then measuring the weights thereof.

However, the calculation was made after removing the area due to x-ray scattering in air.

The polylactic acid based stretch film of the present invention preferably deforms no more than 10% at 200° C. in a thermal deformation test using thermomechanical analysis.

The thermal deformation test of the present invention is performed using a thermal analysis device (thermal stress strain measuring device TMA/SS120 manufactured by Seiko Instruments Inc.) by cutting a test piece with a width of 4 mm from a film applying a load of 0.25 MPa to the test piece between chucks 10 mm apart, increasing the temperature from 30° C. (initial temperature) at a rate of 5° C./minute, and measuring the deformation of the test piece at each temperature (elongation or shrink). The deformation is expressed as the deformation ratio of the test piece. The deformation ratio (%) is calculated as: amount of deformation (direction of elongation)/distance between chucks×100(%).

The polylactic acid based stretch film of the present invention preferably has elongation (tensile elongation at break) of 10% or higher, more preferably 15% or higher in the direction of stretching, and preferably the breaking energy in the direction of stretching is no less than 0.1 mJ, more preferably no less than 0.2 mJ.

For the present invention, the breaking energy (mJ) was determined using a tensile tester (Tensilon Universal Tester RTC-1225 manufactured by Orientec Co., Ltd.) by measuring a 50 mm long 15 mm wide test piece between chucks 20 mm apart at a tensile speed of 300 mm/minute, cutting out the area encompassed by the horizontal axis (strain) and the tensile stress-strain curve from the chart of the tensile stress-strain curve obtained, and measuring the weight thereof (W−1).

Next, the areas encompassed by the tensile strength (MPa) and the elongation (%) were cut out, the weights thereof were measured (W−2), and the breaking energy (mJ) was determined from the ratio of (W−1) and (W−2). Note, the elongation (%) was converted to the distance (mm) required for breaking in order to determine the breaking energy (mJ).

The polylactic acid based stretch film of the present invention is preferably stretched in one direction by a factor of two or greater, more preferably by a factor between 2 and 12, and even more preferably by a factor between 3 and 6. A stretch film where the stretch factor is less than 2 may not have improved thermal resistance On the other hand, the upper limit of the stretching factor is not particularly restricted so long as stretching is possible, but normally films which exceed a factor of 12 will break or there is a possibility that stable stretching will not be possible.

The polylactic acid based biaxial stretch film of the present invention is preferably stretched in the longitudinal direction by a factor of two or greater and in the lateral direction by a factor of 2 or greater, more preferably in the longitudinal direction by a factor between 2 and 7 and in the lateral direction by a factor between 2 and 7, and even more preferably in the longitudinal direction by a factor between 2.5 and 5 and in the lateral direction by a factor between 2.5 and 5. A biaxial stretch film where the stretch factor in one direction is less than 2 may not have improved thermal resistance. On the other hand, the upper limit of the stretching factor is not particularly restricted so long as stretching is possible, but normally films which exceed a factor of 7 will break or there is a possibility that stable stretching will not be possible.

The thickness of the polylactic acid based stretch film of the present invention can be determined based on the application, but the range is normally between 5 and 500 μm, preferably between 10 and 100 μm.

The polylactic acid stretch film of the present invention can be overlaid on another substrate depending on the various applications. Examples of other substrates include films, sheets, cups, and trays made from polyolefins such as polyethylene, polypropylene, poly butene, and polymethyl pentene, polyesters such as polyethylene terephthalate and polycarbonate, as well as nylon, polystyrene, polyvinyl chloride, polyvinylidene chloride, polyvinyl alcohol, ethylene and vinyl alcohol copolymer, polymethyl methacrylate, ethylene and vinyl acetate copolymer, polylactic acid, aliphatic polyester, and other biodegradable polyesters and other thermoplastic resins, as well as foam materials thereof, and glass, metal, aluminum foil, and paper and the like. Films made from these thermoplastic resins may be unstretched, or may be uniaxially or biaxial stretches. Of course one or more layers of the substrates can be used.

For example, a multilayer film made by laminating a silicone resin layer on at least one side of a polylactic acid based stretch film of the present invention is suitable for use as a peeling film or the like. These multilayer films are made from a polylactic acid based stretch film with a thickness between 1 and 300 µm, a cured resin layer with the thickness between 0.1 and 5 µm, and a silicon resin layer with a thickness between 0.01 and 5 µm.

Manufacturing Method of a Polylactic Acid Based Stretch Film

The manufacturing method for the polylactic acid based stretch film of the present invention is a method of stretching a sheet made of the aforementioned polylactic acid based composition by a factor of two or more in one direction, preferably by a factor between 3 and 12, and then heat treating the stretch film obtained normally at a temperature between 140 and 220° C., but preferably between 150 and 200° C. for no less than 1 second, but preferably between 3 seconds and 60 seconds, and more preferably between 3 and 20 seconds, at a temperature normally between 50 and 110° C. but preferably between 60 and 90° C.

If the stretching factor is less than 2, a stretch film with excellent thermal resistance might not be achieved, but on the other hand, the upper limit of the stretching factor is not particularly restricted, but there is a possibility that stable stretching cannot be performed if the factor exceeds 12. If the stretching temperature is less than 50° C., there is a possibility that stable stretching cannot be performed, and there is a possibility that the transparency and the smoothness of the stretch film obtained will be poor.

On the other hand, if the temperature exceeds 110° C., the film might adhere to the heating roller, the surface of the film may become dirty, and stable stretching might not be possible, and there is a possibility that the toughness of the stretch film obtained will be poor. If the heat treatment time is less than 1 second, the heat will not transfer through the stretch film and there is a possibility that the effects of heat treatment will not be seen.

Furthermore, the preheating time will not cause a problem if too long, but a time no greater than 60 seconds is preferable for production.

Another aspect of the manufacturing method for the polylactic acid based stretch film of the present invention is a method of stretching a sheet made of the aforementioned polylactic acid based composition by a factor of two or more in the longitudinal direction and stretching by a factor of two or more in the lateral direction, preferably by a factor between 2 and 7 in the longitudinal direction and by a factor between 2 and 7 in the lateral direction, more preferably by a factor between 2.5 and 5 in the longitudinal direction and by a factor between 2.5 ands in the lateral direction, and then heat treating the stretch film obtained normally at a temperature between 140 and 220° C., but preferably between 150 and 200° C. for no less than 1 second, but preferably between 3 seconds and 60 seconds, and more preferably between 3 and 20 seconds, at a temperature normally between 50 and 110° C. but preferably between 60 and 90° C.

If the heat treatment time is less than 1 second, the heat will not transfer through the stretch film and there is a possibility that the effects of heat treatment will not be seen. Furthermore, the preheating time will not cause a problem if too long, but a time no greater than 60 seconds is preferable for production. The biaxial stretching can be either synchronous biaxial stretching or successive biaxial stretching.

A more preferable and effective manufacturing process is to combine the poly-L-lactic acid and the poly-D-lactic acid, extrude through a T-die either by passing through or not passing through a gear pump located at the front of a twin screw extruder, forming a sheet by a rapidly cooling with a chill roller, and then successively stretching to a factor between 3×3 and 5×5.

Manufacturing the polylactic acid based stretch film of the present invention preferably uses a film or a raw material sheet made from the aforementioned polylactic acid based composition where wide angle x-ray diffraction peaks in the vicinity of 12°, in the vicinity of 21°, and in the vicinity of 24° are not detected ((PSC) is not detected).

If a sheet where wide angle x-ray diffraction peaks (2θ) are detected in the vicinity of 12°, in the vicinity of 21°, and in the vicinity of 24° is used, or in other words if a sheet where stereocomplexes have formed is used, depending on the level of formation, there is possibility that the transparency and the toughness of the stretch film obtained will be poor.

A method of providing a sheet or film made from a polylactic acid composition where wide angle x-ray diffraction peaks (2θ) are not detected in the vicinity of 12°, in the vicinity of 21°, or in the vicinity of 24° C. ((PSC) is not detected) is to melt the aforementioned polylactic acid composition at a temperature no less than 220° C. which is the melting point for the stereocomplex, preferably in a range between 230 and 260° C., rapidly cooling to between 5 and 30° C., and then forming a sheet or film in order to suppress the formation of stereocomplexes.

The manufacturing method for a biaxially oriented film of the present invention preferably involves extruding poly-L-lactic acid with a weight average molecular weight between 150,000 and 200,000 and poly-D-lactic acid with a weight average molecular weight between 200,000 and 350,000 through a T-die of a twin screw extruder either passing through are not passing through a gear pump at the leading edge of the twin screw extruder at an extrusion temperature between 245 and 255° C. using a weight ratio of poly-L-lactic acid to poly-D-lactic acid of between 45/55 and 55/45, forming a sheet by rapidly cooling using a chill roller at a temperature between 0 and 30° C., and then performing successive biaxial stretching or simultaneous biaxial stretching to a factor of at least 2 at a stretching temperature between 50 and 80° C.

Other Moldings

The polylactic acid composition of the present invention can also be used as various types of moldings using various molding methods such as injection molding, blow molding, extrusion molding, vacuum molding, air pressure molding, or vacuum molding or air pressure molding after stretching slightly to a factor between 1.1 and 1.5.

Injection molding can be performed using a standard injection molding method, injection compression molding method, or gas assist molding method. Furthermore, two color molding, in-mold forming, and gas press molding can also be used. Furthermore, the resin temperature in the cylinder is preferably higher than 200° C. in order to prevent crystallization and thermal degradation and normally the temperature is between 200° C. and 250° C.

Within this range, the temperature of the leading end of the cylinder is between 200 and 240° C. in at least one zone, and a temperature between 210 and 220° C. is preferable, and preferably an injection molder is used where the zone on the hopper side (supply side) is between 230 and 250° C. Note, the composition of the present invention which has once been melted is preferably injected at a temperature close to the melting point of the stereocomplex structure polylactic acid.

Furthermore, a mold temperature between 100 and 160° C., and a retention time in the molds between 10 seconds and 3 minutes are preferable in order to be able to promote crystallization.

The injection moldings can be heat treated to induce crystallization. By inducing crystallization in these moldings, the thermal resistance of the moldings can be further increased. The crystallization process can be performed in the mold during molding, and/or after removal from the mold. From a productivity perspective, if the crystallization speed of the resin composition for forming an injection molding is too slow, a crystallizing process is preferably performed after removal from the mold, but on the other hand if the crystallization speed is fast, the crystallizing process can be performed in the mold.

If the crystallization process is performed after the molding has been removed from the mold, the heat treatment temperature is preferably in a range between 60 and 180° C. If the heat treatment temperature is less than 60° C., crystallization will not proceed in the molding process, but if the temperature exceeds 180° C., deformation and shrinkage will occur when the molding is cooled. The heating time is appropriately determined based on the composition of the resin that makes the injection molding and the heat treatment temperature, and for example, if the heat treatment temperature is 70° C., the heat treatment will be performed for between 15 minutes and 5 hours. Furthermore, if the heat treatment temperature is 130° C., the heat treatment will be performed for between 10 seconds and 30 minutes.

Of these injection moldings, those which are used as a container or the like preferably have transparency such that the total light transmissivity (TT) is 60% or higher at a thickness of 3 mm in order for the contents of the container to be visible.

Furthermore, when vacuum/air pressure molding, methods which cause the sheet to contact with the mold can provide a high quality container, and productivity will be high, so for these reasons, vacuum molding, air pressure molding, and press molding methods are preferable.

With vacuum molding, a molder that is commonly used for molding plastic can be favorably used, and when forming the sheet, the surface temperature of the sheet is preheated to between 110 and 150° C. using a heating plate or hot air, and then the sheet is preferably brought into close contact with the cavity at a cavity temperature between 100 and 150° C. The cavity has a plurality of fine holes and molding is performed by reducing the pressure in the cavity, and thus a container with good form reproducibility can be achieved.

Furthermore, in the vacuum molding method, thinning due to localized spreading of the sheet can be prevented by providing a pressing device called a plug.

When air pressure molding, a molder that is commonly used for molding plastic can be favorably used, and after plasticizing the sheet using a heating plate, pressure molding of the sheet is performed on the sheet by the action of air pressure from a plurality of fine holes formed across the entire heating plate, and thus a container with good form reproducibility can be achieved.

Vacuum/air pressure moldings obtained in this manner preferably have excellent thermal resistance and will not be form even by hot water (98° C.).

These injection moldings, blow moldings, vacuum/air pressure moldings, and extrusion moldings can be used as various types of moldings such as components for electrical and electronic products, decorative products, automotive interior products, as well as sheets, films, yarns, tapes, fabrics, nonwoven materials, and foam molded parts for various packaging applications in industry and food preparation. Furthermore, various types of spinning methods are conventionally known such as both the component fiber spinning and spunbond spinning.

The molded product of the present invention can be laminated with another material if necessary such as a film or the like Examples include polyolefins or other biodegradable plastic layers, and thin layers of inorganic materials and the like.

Of these, a laminate structure with excellent gas barrier properties can be made by providing a thin-film of either an inorganic material or a polymer of unsaturated carboxylic acids such as acrylic acid or derivatives thereof. Layers with gas barrier resistance can be obtained by using a polymer made from an unsaturated carboxylic acid or derivative thereof, or by a polymer obtained by polymerizing an unsaturated carboxylic acid such as acrylic acid, methacrylic acid, maleic acid, or itaconic acid or the like as well as metal salts thereof such as strontium, magnesium, and zinc salt or the like, as well as by polymerizing these monomers in the presence of a polymer such as a polyvinyl alcohol.

Inorganic Thin-Film Layers

The thin-film of inorganic material is made by forming a thin-film of an inorganic materials such as a metal, metal oxide, metal nitride, or metal carbide or the like onto a film, and this coating is not particularly restricted so long as the coating can provide gas barrier properties to the film. Specific examples of the metals include aluminum, nickel, titanium, copper, gold, and platinum, specific examples of metal oxides include silicon oxide, aluminum oxide, and titanium oxide and the like.

When selecting the specific material from these metals, metal oxides, metal nitrides, or metal carbides, a comprehensive decision is made based on the physical properties required of the laminate film and the adhesion between both layers. For example, aluminum is suitable when the objective is high gas barrier properties. However, if good transparency is also required, an inorganic oxide and specifically silicon oxide or aluminum oxide are preferable. Furthermore, various types of adhesives may be used as an anchor coat in order to improve the adhesion with the film base layer.

Furthermore, silicon oxides are not restricted only to compounds expressed by SiO or $SiO_2$, but may also be compositions expressed by the compositional formula $SiO_x$ (x is between 1.0 and 2.0). For example, a 1:1 composition of SiO and $SiO_2$ can be used. These inorganic films can be formed by various commonly known methods such as vapor deposition, sputtering, and Cat-CVD and the like.

A laminate film made by laminating the aforementioned gas barrier layer onto the film of the present invention can be used for a variety of applications. Examples include packaging materials for dried foods, waters, bottle retort foods, and food supplements; packaging for toilet tree products such as shampoo, detergent, bathing salts, and fragrances; medical packaging for powders, granules, and tablets; medical packaging for liquids such as liquid transport bags; packaging for medical tools; packaging for electronic components such as hard disks, wiring boards, and printed circuit boards; barrier layer materials for liquid crystal displays, plasma displays, inorganic and organic EL displays, and electronic paper; barrier materials for other electronic materials; barrier materials for vacuum insulation materials; packaging for industrial products such as ink cartridges; barrier materials for solar batteries and fuel cells; and back sheets.

EMBODIMENTS

The present invention will be more concretely described by presenting the following embodiments, but the present invention is not restricted to these embodiments so long as the main points of the invention are not violated.

The polylactic acid used in the embodiments and the comparative examples was as shown below.
(a) poly-L-lactic Acid (PLLA-1):
Amount of D isomer: 1.9% Mw: 183,000 (222,000) (g/mol), Tm: 162.9° C., and Tg: 58.1° C.
(b) poly-D-lactic acid (PDLA-1, product of PURAC Co., Ltd.)
Amount of D isomer: 100.0%, Mw: 323,000 (404,000) (g/mol), Tm: 178.4° C., and Tg: 59.2° C.
(c) poly-D-lactic acid (PDLA-2, product of PURAC Co., Ltd.)
Amount of D isomer: 100.0%, Mw: 223,000 (298,000) (g/mol), Tm: 176.0° C., and Tg: 58.2° C.

The measurement methods of the present invention are shown below.
(1-1) Weight Average Molecular Weight (Mw)
The following measurement is a standard method for measuring the molecular weight of macromolecules, and the measurement results are shown in brackets.

10 mL of GPC eluent were added to 20 mg of test sample, and after setting overnight, the composition was slowly mixed by hand. This liquid was filtered through an amphipathic 0.45 µm PTFE filter (ADVANTEC DISMIC-25HP045AN) to make the GPC test solution.
Measurement device: Shodex GPC System-21
Analysis device: data analysis program: SIC480 data station II
Detector: differential reflectometer (RI)
Column: Shodex GPC K-G+K-806L+806L
Column temperature: 40° C.
Fluent: chloroform
Flow rate: 1.0 mL/minute
Injection quantity: 200 µL
Molecular weight correction: Monodispersed polystyrene
(1-2) Weight Average Molecular Weight (Mw)
The following measurement method is particularly suitable for measuring polylactic acid stereocomplex structures, and the measurement results are shown without brackets.

20 mg of test solution were dissolved in a mobile phase (concentration 0.5%), and then filtered through a the 0.45 µM hydrophilic PTFE filter (Millex-LH; Japan Millipore), to make the GPC test solution.
Column: PL HFIP gel (300×7.5 mm)×2 (Polymer Laboratories)
Column temperature: 40° C.
Mobile phase: HFIP+5 mM TFANa
Flow rate: 1.0 mL/minute
Detection: RI
Injection quantity: 50 µL
Measurement device: 510 high-pressure pump, U6K water injector, 410 differential refractometer (Japan Waters)
Molecular weight correction: Monodispersed PMMA (Easi Cal PM-1; Polymer Laboratories)

(2) DSC Measurement
Using a Q100 manufactured by TA Instruments as the differential scanning calorimeter (DSC) approximately 5 mg of test sample was accurately weighed and heated from 0° C. to 250° C. at a heating rate of 10° C./minute under a nitrogen gas flow rate of 50 mL/minute in conformance with JIS K 7121, and after the test sample had melted, the temperature was maintained at 250° C. for 10 minutes, and then cooled at a rate of 10° C./minute to 0° C., and after crystallization had occurred, the temperature was again increased to 250° C. at a rate of 10° C./minute to obtain a heat of melting curve, and the melting point (Tm) of the test sample, the height of the melting point peak during the second heating, the glass transition temperature (Tg), the crystallization temperature (Tc) during cooling, and the amount of heat (Hc) were determined from the heat of melting curve obtained.

Note, the height of the peak was determined by the height from a baseline obtained by connecting a baseline in the 65° C. to 75° C. range to a baseline and the 240° C. to 250° C. range.
(3) Transparency
The haze (HZ) and the parallel light transmissivity (PT) were measured using a haze meter 300A manufactured by Nippon Denshoku Industries Co., Ltd.
(4) Surface Roughness
The average surface roughness (SRa) at the center of the film surface was measured using a SE-30K three-dimensional surface roughness measuring device manufactured by Kosaka Laboratory, Ltd.
(5) Tensile Test
The tensile test was performed on strips of test pieces (length 50 mm, with 15 mm) cut from the film in both the MD direction (taken only from the direction of stretching for a monoaxial stretch film) and the TD direction, using a tensile tester (RTC-1225 Tensilon Universal Tester manufactured by Orientec Co., Ltd.) and a chuck distance of either 20 mm or 100 mm and a crosshead speed of 300 mm/minute (However, Young's modulus was measured at 5 mm/minute) in order to determine the tensile strength (MPa), elongation (W), and Young's modulus (MPa).

Note, the breaking energy (mJ) was determined by the method shown above.

Note that embodiments 1 through 4, comparative examples 1 and 2, and reference examples 1 through 3 were measured at a chuck distance of 20 mm, while embodiments 7 through 18, 29 through 34, comparative examples 4 through 9, 20 through 23, and reference examples 1, 3, and 6 were measured at a chuck distance of 100 mm.
(6) Vapor Permeability (Water Vapor Permeability)
This value was determined in conformance with JIS Z0208. A sample of the film was made into a bag with a surface area of approximately 100 cm², filled with an appropriate quantity of calcium chlorides and sealed. This bag was then placed in a 40° C. 90% RH (relative humidity) environment for three days, and the vapor permeability was determined from the increase in weight.
(7) Oxygen Permeability
The oxygen permeability was measured using an oxygen permeability tester (OXTRAN 2/21 mL manufactured by MOCON) at 20° C. and 0% RH (relative humidity) in conformance with JIS K 7126.
(8) Thermal Resistance
The thermal resistance of the stretch film was measured by a thermal deformation tester using thermal mechanical analysis as described above.

(9) Softening Temperature

The measurement was made by the method shown in JIS K 7196. Measurement of needle penetration at the softening temperature was performed using a TMA device (coefficient of linear expansion measurement used a compression type), and the conditions for measuring the softening temperature were as shown below.

Heating speed: 5° C./minute

Weight: 50 g

Shape of needle tip: tip diameter 1 mm×length 2 mm, 3 mm diameter cylinder (quartz)

(10) Enzyme Analysis of Poly-L-Lactic Acid

Based on the content of "Blend of Aliphatic Polymers: V Non-Enzymatic and Enzymatic Hydrolysis of Blends from Hydrophobic Poly(L-Lactide) and Hydrophobic Poly(Vinyl Alcohol): Polymer Degradation and Stability" 71 (2001) 403-413, Hideto Tuji, et al., 1 mol/L of a Tris-HCl (tris(hydroxymethyl)aminomethane HCl) buffered solution (manufactured by Nacalai Tesque) was diluted by a factor of 5 with distilled water, and then 60 mg of test reagent grade sodium azide, and 60 mg of proteinase K (activity ratio: 30 u/mg solid, manufactured by Nacalai Tesque) were dissolved in 300 mL of the dilute solution while mixing.

10 cc of the enzyme solution obtained above and a press sheet obtained by the following test (thickness approximately 500 µm×10 mm×10 mm, weight: approximately 70 mg) were placed in a test tube which was then placed in a temperature and vibration chamber Thomastat T-N225 manufactured by TOHMAS KAGAKU at 40° C., and vibrated at a frequency of 15 Hz across a path of approximately 10 cm.

The enzyme solution was exchanged after 13 days and 26 days from the start of testing, and the weight was measured and the surface was observed by scanning electron microscope (SEM) on the 13th day and the 38th day (completion).

(11) Surface Observation by Scanning Electron Microscope (SEM)

The surface was coated with gold using a IB-2 model ion coater manufactured by Eiko Engineering, and then the surface was observed at a zoom factor of 1500× and 5000× using a JED-2300 model scanning electron microscope manufactured by JEOL Datum.

(12) Injection Molding Processability (Mold Opening Property)

The mold opening property was considered good if the molding was hard when the mold was opened after injection filling. Furthermore, the mold opening property was considered poor if the molding was soft, the shape was damaged after removal, if removal was not possible using a set pin, or if spray was left in the mold.

(13) Thermal Resistance of Vacuum Moldings

The thermal resistance of vacuum moldings (containers) was measured by placing the molding in 98° C. hot water up to 6 cm from the bottom, and checking for the occurrence of deformation.

However, embodiment 35 was measured at 3 cm from the bottom because of the shallow bottom.

◯: No deformation

Δ: Slight deformation (deformation primarily on bottom)

X: large deformation (container is skewed so that liquids will spill)

(14) Degree of Orientation

The degree of orientation was measured by the formula: degree of orientation=$(N_x+N_y)/2-N_z$
using the refractive index measured by the method shown below ($N_x$ (MD parallel), $N_y$ (TD parallel), $N_z$ (thickness)).

Test method: Abbe method (Method A) Test device: Abbe Refractometer Model DR-M2 (manufactured by Atago Co., Ltd.)

Test temperature: 23° C./50% RH

Test wavelength: D line (589 nm)

Measurement method: $N_x$ (MD parallel), $N_y$ (TD parallel), $N_z$ (thickness)

Number of tests: n=3

Embodiment 1

Production of Polylactic Acid Composition

A polylactic acid composition (composition 1) was obtained by measuring 80 g of PLLA-1:PDLA-1 at a ratio of 50:50 (weight %), melting and kneading for 15 minutes at 250° C. and 60 rpm using a Model C Laboplast mill manufactured by Toyo Seiki Seisakusho Co., Ltd. (twin screw kneader).

<Production of Press Sheet>

A press sheet (press sheet 1) was obtained by placing composition 1 between 50 µm thick polyamide films (product name: Upirex 50S, manufactured by Ube Industries, Ltd.) which were then placed in a 270 mm×270 mm stainless steel rectangular mold frame with a thickness of 0.5 mm, and press molding under conditions of: press temperature: 250° C., initial pressure: 3 minutes (pressure 0), gas purge: 5 times, press time: 4 minutes (pressure 100 kgf), cooling: 5 minutes (pressure 10 kgf).

<Production of Biaxial Stretch>

A 50 µm thick biaxial stretch was obtained by preheating a press sheet 1 for 50 seconds with 60° C. hot air using a pantograph type batch biaxial stretching device (Heavy model manufactured by Toyo Seiki Seisakusho Co., Ltd.), stretching to a factor of 3.0 in the longitudinal and lateral directions at a speed of 5 m/minute (simultaneous biaxial stretching), and then immediately cooling the stretch film using a fan.

Next, the biaxial stretch obtained was secured by clips in a metal frame and heat set (heat treated) at conditions of 180° C.×30 seconds, and then sufficiently cooled to room temperature to obtain a polylactic acid based biaxial stretch.

The polylactic acid based biaxial stretch that was obtained was evaluated by the aforementioned methods.

The evaluation results are shown in Table 1 and Table 2.

Embodiment 2

Preparation was similar to embodiment 1, except that the heat set conditions for the biaxial stretch of embodiment 1 were changed to 200° C.×30 minutes.

The results are shown in Table 1 and Table 2.

Embodiment 3

Preparation was similar to embodiment 1, except that the stretching temperature of embodiment 1 was changed to 85° C.

The results are shown in Table 1 and Table 2.

Embodiment 4

Preparation was similar to embodiment 1, except that the stretching ratio of embodiment 1 was changed to 1×4.
The results are shown in Table 1 and Table 2.

Comparative Example 1

Preparation was similar to embodiment 1, except that the conditions for manufacturing the polylactic acid based composition of embodiment 1 were changed to a mixing time of 3 minutes.
The results are shown in Table 1 and Table 2.

Comparative Example 2

Preparation was similar to embodiment 1, except that the heat treatment conditions for comparative example 1 were changed to 200° C.×30 minutes.
The results are shown in Table 1 and Table 2.

Reference Example 1

Preparation was similar to embodiment 1, except that the conditions for manufacturing the polylactic acid based composition of embodiment 1 were changed to use PLLA-1 without kneading.
The results are shown in Table 1 and Table 2.

Reference Example 2

Preparation was similar to embodiment 2, except that the conditions for manufacturing the polylactic acid based composition of embodiment 2 were changed to use PLLA-1 without kneading.
The results are shown in Table 1 and Table 2.

Reference Example 3

Preparation was similar to embodiment 1, except that the conditions for manufacturing the polylactic acid based composition of embodiment 1 were changed to use PDLA-1 without kneading.
The results are shown in Table 1 and Table 2

TABLE 1

| Item | Units | Embodiment 1 | Embodiment 2 | Embodiment 3 | Embodiment 4 | Comparative Example 1 | Comparative Example 2 | Reference 1 | Reference 2 | Reference 3 |
|---|---|---|---|---|---|---|---|---|---|---|
| 1. Composition | | | | | | | | | | |
| PLLA-1 | (wt %) | 50 | 50 | 50 | 50 | 50 | 50 | 100 | 100 | |
| PDLA-1 | (wt %) | 50 | 50 | 50 | 50 | 50 | 50 | | | 100 |
| (1) Kneading Conditions | | | | | | | | | | |
| Kneading temperature | (° C.) | 240 | 240 | 240 | 240 | 240 | 240 | None | None | None |
| Kneading speed | (rpm) | 60 | 60 | 60 | 60 | 60 | 60 | | | |
| Kneading time | (minutes) | 15 | 15 | 15 | 15 | 3 | 3 | | | |
| Kneading energy | (J/80 g) | | | | | | | | | |
| (2) DSC Measurement results | | | | | | | | | | |
| Heat of crystallization | (J/g) | 57.3 | 57.3 | 57.3 | 57.3 | 13.2 | 13.2 | 0 | 0 | 5.9 |
| Peak height (W/g) for second heating | | | | | | | | | | |
| | Tm = approx. 159° C. | | | | | 0.17 | 0.17 | | | |
| Tm = 150 to 180° C. | Tm = approx. 165° C. | | | | | 0.19 | 0.19 | 0.45 | 0.45 | |
| | Tm = approx. 175° C. | | | | | 0.31 | 0.31 | | | 0.91 |
| Tm = 200 to 250° C | Tm = approx. 207° C. | | | | | | | | | |
| | Tm = approx. 216° C. | 0.72 | 0.72 | 0.72 | 0.72 | 0.22 | 0.22 | | | |
| 2. Moldings (stretch film) | | | | | | | | | | |
| (1) Stretching conditions | | | | | | | | | | |
| Stretching factor | (—) | 3 × 3 | 3 × 3 | 3 × 3 | 1 × 4 | 3 × 3 | 3 × 3 | 3 × 3 | 3 × 3 | 3 × 3 |
| Stretching temperature | (° C.) | 60 | 60 | 85 | 85 | 60 | 60 | 60 | 60 | 60 |

TABLE 1-continued

| Item | Units | Embodiment 1 | Embodiment 2 | Embodiment 3 | Embodiment 4 | Comparative Example 1 | Comparative Example 2 | Reference 1 | Reference 2 | Reference 3 |
|---|---|---|---|---|---|---|---|---|---|---|
| (2) Heat treatment conditions | | 180° C. × 30 seconds | 200° C. × 30 minutes | 180° C. × 30 seconds | 180° C. × 30 minutes | 180° C. × 30 seconds | 200° C. × 30 | 180° C. × 30 seconds | 200° C. × 30 minutes | 180° C. × 30 seconds |
| Thickness | (μ) | 42 | 42 | 43 | 98 | 55 | 55 | 53 | Not obtainable | 53 |

TABLE 2

| | | Embodiment 1 | Embodiment 2 | Embodiment 3 | Embodiment 4 | Comparative Example 1 | Comparative Example 2 | Reference 1 | Reference 2 | Reference 3 |
|---|---|---|---|---|---|---|---|---|---|---|
| Transparency | | | | | | | | | | |
| HZ | (%) | 6.6 | 3.2 | 5.4 | 7.3 | 50.6 | 45.8 | 5.1 | | 5.1 |
| PT | (%) | 86.7 | 89.5 | 87.4 | 83.1 | 45.0 | 50.1 | 89.0 | | 89.0 |
| Surface Roughness (SRa) | (μ) | 0.04 | 0.04 | 0.04 | 0.05 | 0.94 | 0.95 | 0.04 | | 0.04 |
| Tensile Test | | | | | | | | | | |
| Breaking strength | (MPa) | 93 | 93 | 94 | 106 | 58 | 58 | 126 | | 114 |
| Elongation at break | (%) | 83 | 10 | 78 | 101 | 28 | 4 | 110 | | 102 |
| Breaking energy | (mJ) | 1.05 | 0.13 | 1.00 | 1.45 | 0.21 | 0.03 | 1.42 | | 1.18 |
| Young's modulus | (MPa) | 2451 | 2434 | 2450 | 2651 | 1397 | 1946 | 2200 | | 2122 |
| Thermal resistance | 100° C. | 0.9 | 0.7 | 0.8 | 0.9 | 0.7 | 1.6 | Δ1.5 | | Δ1.1 |
| | 120° C. | 1.6 | 1.1 | 1.4 | 1.8 | 1.6 | 2.5 | Δ4.2 | | Δ4.0 |
| | 140° C. | 2.3 | 1.6 | 2.1 | 2.6 | 2.2 | 3.4 | Δ7.0 | | Δ6.7 |
| | 160° C. | 3.0 | 2.0 | 2.8 | 3.1 | 0.8 | 4.1 | Δ12.0 | | Δ11.1 |
| | 180° C. | 4.2 | 2.4 | 3.8 | 4.4 | Δ5.5 | 4.7 | melted | | melted |
| | 200° C. | 5.3 | 2.9 | 4.9 | 5.7 | 5.1 | 5.4 | melted | | melted |
| | 220° C. | Melted | Melted | Melted | Melted | Melted | Melted | Melted | | Melted |
| Wide angle x-ray diffraction | | | | | | | | | | |
| SSC | (Cutting: mg) | 64.0 | 49.4 | 62.0 | 64.2 | 18.2 | 58.2 | 0 | | 0 |
| PPL | (Cutting: mg) | 3.1 | 0 | 2.1 | 2.3 | 29.5 | 0 | — | | — |
| SSC ratio | (%) | 95.4 | 100 | 96.7 | 96.5 | 38.2 | 100 | 0 | | 0 |
| Barrier performance | | | | | | | | | | |
| Vapor permeability (30μ) | (g/m² d) | | 184 | | | | | 290 | 293 | |
| Oxygen permeability (30μ) | (cc/m² day atm) | | 56 | | | | | | 728 | |

As can be seen from Table 1 and Table 2, the stretch films of embodiments 1 through 4 were made from a composition 1 for which in the DSC measurement of the composition, the peak during cooling (10° C./minute) after a 10 minute soak was equal to or greater than 45 mJ/mg, and there were no peaks for Tm=150 to 180° C. during the second heating, and these films all had excellent smoothness with a surface roughness (SRa) no greater than 0.1 μm, and excellent transparency with a haze of 10%.

Furthermore, from the results of the thermal deformation measurements, embodiment 2 which was heat treated as a particularly high temperature had smaller deformation due to temperature and was more stable than comparative examples 1 and 2. Furthermore, looking at the gas barrier properties, the stretch film of embodiment 2 which was made from a composition 1 for which in the DSC measurement, the peak during cooling (10° C./minute) after a 10 minute soak was equal to or greater than 45 mJ/mg, and there were no peaks for Tm=150 to 180° C. during the second heating, had improved gas barrier properties with humidity permeability at ⅓ and oxygen permeability at 1/10 that of the reference example 1 consisting of PLLA isomer.

A reference example 1 and 3 consisting of either PLLA or PDLA isomer had excellent surface smoothness and transparency, but the thermal deformation was larger than with embodiments 1 through 4, and melting occurred at 180° C. Furthermore, with reference example 2, the film melted during heat treatment, so results could not be obtained.

Embodiment 5

Manufacture of a Polylactic Acid Composition

A polylactic acid composition (composition 2) was obtained by measuring 80 g of PLLA-1:PDLA-1 at a ratio of 50:50 (weight %), melting and kneading for 15 minutes at 250° C. and 60 rpm using a Model C Laboplast mill manufactured by Toyo Seiki Seisakusho Co., Ltd. (twin screw kneader).

<Production of Press Sheet>

A press sheet (press sheet 2) was obtained by placing composition 1 between 50 μm thick polyamide films (product name: Upirex 50S, manufactured by Ube Industries, Ltd.) which were then placed in a 270 mm×270 mm stainless steel rectangular mold frame with a thickness of 0.5 mm, and press molding under conditions of: press temperature: 240° C., initial pressure: 3 minutes (pressure 0), gas purge: 5 times, press time: 4 minutes (pressure 100 kgf), cooling: gradual cooling in metal frame at room temperature.

Embodiment 6

Preparation was similar to embodiment 5, except that the polylactic acid composition (composition 2) of embodiment 5 was adjusted such that PLLA-1: PDLA-1=60:40.

The results are shown in Table 3.

Comparative Example 3

Preparation was similar to embodiment 5, except that the polylactic acid composition (composition 2) of embodiment 5 was adjusted such that PLLA-1: PDLA-1=100:0.

The results are shown in Table 3.

TABLE 3

| Item | Units | Embodiment 5 | Embodiment 6 | Comparative Example 3 |
|---|---|---|---|---|
| 1. Composition | | | | |
| PLLA-1 | (Wt %) | 50 | 70 | 100 |
| PDLA-1 | (Wt %) | 50 | 30 | 0 |
| 2. Kneading conditions | | | | |
| Kneading temperature | (° C.) | 250 | 250 | 250 |
| Kneading speed | (rpm) | 60 | 60 | 60 |
| Kneading time | (minutes) | 15 | 15 | 15 |
| 3. Molding conditions | | | | |
| Press temperature | (° C.) | 250 | 250 | 250 |
| Press pressure | (MPa) | 400 | 400 | 400 |
| Press time | (minutes) | 60 | 60 | 60 |
| Cooling conditions | | Gradual | Gradual | Gradual |
| Thickness of press sheet | (μ) | 510 | 520 | 520 |
| 4. Thermal resistance | | | | |
| Softening temperature | (° C.) | 217.5 | 173.9 | 158.1 |

As can be seen from Table 3, the gradually cooled press sheet of embodiment 5 made from composition 2 had no peaks in the range Tm=150 to 180° C. during the second heating and had a heat of crystallization that was no less than 50 (J/g), and this press sheet had high thermal resistance at 217° C. in the DSC measurement results. Furthermore, the gradually cooled press sheet of embodiment 6 containing 70% PDLA also had high thermal resistance at 174° C.

Embodiment 7

Manufacturing the Polylactic Acid Composition

A polylactic acid composition (composition 7) was prepared by measuring a 50:50 ratio (wt %) of PLLA-1:PDLA-2, and then kneading and extruding using a unirotational twin screw kneader extruder manufactured by Toshiba Machine Co. Ltd. (TEM-37BS screw diameter: 37 mm, number of screws: 2, screw length (l/d): 42, screw pattern (i) (screw region: 1144 mm, mixing region: 382 mm) at a feed rate of 30 g/minute under conditions of C1 through C12: 250° C., and 400 rpm.

<Production of Press Sheet>

A press sheet (press sheet 7) was obtained by placing composition 7 between 50 μm thick polyamide films (product name: Upirex 50S, manufactured by Ube Industries, Ltd.) which were then placed in a 270 mm×270 mm stainless steel rectangular mold frame with a thickness of 0.5 mm, and press molding under conditions of: press temperature: 250° C., initial pressure: 3 minutes (pressure 0), gas purge: 5 times, press time: 4 minutes (pressure 100 kgf), cooling: 5 minutes (pressure 10 kgf).

<Production of Biaxial Stretch>

A 50 μm thick biaxial stretch was obtained by preheating a press sheet 7 for 60 seconds with 70° C. hot air using a pantograph type batch biaxial stretching device (KAR 04, manufactured by Brueckner) stretching to a factor of 3.0 in the longitudinal and lateral directions at a speed of 2.1 m/minute (simultaneous biaxial stretching), and then heat setting for 1 minute at 200° C.

The polylactic acid based biaxial stretch that was obtained was evaluated by the aforementioned methods.

Evaluation results are shown in Table 4.

Embodiment 8

Preparation was similar to embodiment 7, except that the feeding speed condition of embodiment 7 was changed to 60 g/minute.

The results are shown in Tables 4-1 through 4-6.

Embodiment 9

Preparation was similar to embodiment 7, except that the twin screw extrusion pattern of embodiment 7 was changed to type (ii) (screw region: 994 mm, mixing region: 532 mm).

The results are shown in Tables 4-1 through 4-6.

Embodiment 10

Preparation was similar to embodiment 7, except that the feeding speed of embodiment 7 was changed to 60 g/minute, and the twin screw extrusion pattern was changed to type (ii) (screw region: 994 mm, mixing region: 532 mm).

Furthermore, only an evaluation of the composition by DSC was performed, and neither a press sheet nor a biaxial stretch film was produced.

The results are shown in Tables 4-1 through 4-6.

Embodiment 11

Preparation was similar to embodiment 7, except that the twin screw extrusion pattern of embodiment 7 was changed to type (iii) (screw region: 882 mm, mixing region: 644 mm). Furthermore, only an evaluation of the composition by DSC was performed, and neither a press sheet nor a biaxial stretch film was produced.

The results are shown in Tables 4-1 through 4-6.

Embodiment 12

Preparation was similar to embodiment 7, except that the feeding speed of embodiment 7 was changed to 60 g/minute, and the twin screw extrusion pattern was changed to type (iii) (screw region: 882 mm, mixing region: 644 mm).

Furthermore, only an evaluation of the composition by DSC was performed, and neither a press sheet nor a biaxial stretch film was produced.

The results are shown in Tables 4-1 through 4-6.

Embodiment 13

Preparation was similar to embodiment 7, except that the PDLA-2 of embodiment 7 was changed to PDLA-1, and the twin screw extrusion pattern was changed to type (iii) (screw region: 882 mm, mixing region: 644 mm).

Furthermore, only an evaluation of the composition by DSC was performed, and neither a press sheet nor a biaxial stretch film was produced.

The results are shown in Tables 4-1 through 4-6.

Embodiment 14

Preparation was similar to embodiment 7, except that the PDLA-2 of embodiment 7 was changed to PDLA-1, the feeding speed was changed to 60 g/minute, and the twin screw extrusion pattern was changed to type (iii) (screw region: 882 mm, mixing region: 644 mm).

Furthermore, only an evaluation of the composition by DSC was performed, and neither a press sheet nor a biaxial stretch film was produced.

The results are shown in Tables 4-1 through 4-6.

Embodiment 15

Preparation was similar to embodiment 7, except that the twin screw extruder cylinder temperature pattern of embodiment 7 was changed to C1 through C6/C7 through C12=250° C./200° C., and the twin screw extrusion pattern was changed to type (iii) (screw region: 882 mm, mixing region: 644 mm).

Furthermore, only an evaluation of the composition by DSC was performed, and neither a press sheet nor a biaxial stretch film was produced.

The results are shown in Tables 4-1 through 4-6.

Comparative Example 4

Preparation was similar to embodiment 7, except that the feed speed condition of embodiment 7 was changed to 160 g/minute.

The results are shown in Tables 4-1 through 4-6.

Comparative Example 5

Preparation was similar to embodiment 7, except that the feed speed condition of embodiment 7 was changed to 340 g/minute.

The results are shown in Tables 4-1 through 4-6.

Comparative Example 6

Preparation was similar to embodiment 7, except that the feed speed condition of embodiment 7 was changed to 340 g/minute, and the screw rotation speed was set to 200 rpm.

The results are shown in Tables 4-1 through 4-6.

Comparative Example 7

Preparation was similar to embodiment 7, except that the feeding speed of embodiment 7 was changed to 160 g/minute, and the twin screw extrusion pattern was changed to type (ii) (screw region: 994 mm, mixing region: 532 mm).

Furthermore, only an evaluation of the composition by DSC was performed, and neither a press sheet nor a biaxial stretch film was produced.

The results are shown in Tables 4-1 through 4-6.

Comparative Example 8

Preparation was similar to embodiment 7, except that the feeding speed of embodiment 7 was changed to 340 g/minute, and the twin screw extrusion pattern was changed to type (ii) (screw region: 994 mm, mixing region: 532 mm).

Furthermore, only an evaluation of the composition by DSC was performed, and neither a press sheet nor a biaxial stretch film was produced.

The results are shown in Tables 4-1 through 4-6.

Comparative Example 9

Preparation was similar to embodiment 7, except that the feeding speed of embodiment 7 was changed to 160 g/minute, and the twin screw extrusion pattern was changed to type (iii) (screw region: 882 mm, mixing region: 644 mm).

Furthermore, only an evaluation of the composition by DSC was performed, and neither a press sheet nor a biaxial stretch film was produced.

The results are shown in Tables 4-1 through 4-6.

Reference Example 4

PLLA-1 was evaluated as is using a DSC, and a press sheet was fabricated. A biaxial stretch was not produced.

The results are shown in Tables 4-1 through 4-6.

Reference Example 5

PDLA-2 was evaluated as is using a DSC, and a press sheet was fabricated. A biaxial stretch was not produced.

The results are shown in Tables 4-1 through 4-6.

TABLE 4-1

|  | Embodiment 7 | Embodiment 8 | Embodiment 9 | Embodiment 10 | Embodiment 11 | Embodiment 12 | Embodiment 13 |
|---|---|---|---|---|---|---|---|
| Screw type | (1) | (1) | (2) | (2) | (3) | (3) | (3) |
| Rotational speed (rpm) | 400 | 400 | 400 | 400 | 400 | 400 | 400 |
| Feed (g/minute) | 30 | 60 | 30 | 60 | 30 | 60 | 30 |

TABLE 4-1-continued

|  | Embodiment 7 | Embodiment 8 | Embodiment 9 | Embodiment 10 | Embodiment 11 | Embodiment 12 | Embodiment 13 |
|---|---|---|---|---|---|---|---|
| Temperature (° C.) | | | | | | | |
| C1 to C6 | 250 | 250 | 250 | 250 | 250 | 250 | 250 |
| C7 to C12 | 250 | 250 | 250 | 250 | 250 | 250 | 250 |
| PLLA | PLLA-1 | PLLA-1 | PLLA-1 | PLLA-1 | PLLA-1 | PLLA-1 | PLLA-1 |
| PDLA | PDLA-2 | PDLA-2 | PDLA-2 | PDLA-2 | PDLA-2 | PDLA-2 | PDLA-1 |
| PLLA molecular weight | 183,000 | 183,000 | 183,000 | 183,000 | 183,000 | 183,000 | 183,000 |
| PDLA molecular weight | 223,000 | 223,000 | 223,000 | 223,000 | 223,000 | 223,000 | 223,000 |
| Average molecular weight | 203,000 | 203,000 | 203,000 | 203,000 | 203,000 | 203,000 | 203,000 |
| Formulation ratio (PLLA/PDLA) | 50/50 | 50/50 | 50/50 | 50/50 | 50/50 | 50/50 | 50/50 |
| Molecular weight of blend | 102,000 | 117,000 | 90,500 | 112,000 | 97,800 | 121,000 | 101,000 |
| Molecular weight before and after kneading | 0.50 | 0.58 | 0.45 | 0.55 | 0.48 | 0.60 | 0.40 |
| SEM dispersion observation (press sheet) | | | | | | | |
| After 13 days | FIG. 5 | | | | | | |
| Weight reduction (wt %) | 7.5 | | | | | | |
| Condition of dispersion | Elution of islands | | | | | | |
| Details | 121 holes with diameter of approximately 0.1 to 0.7 μm present in 5 μm × 5 μm area (planar) | | | | | | |
| After 38 days | FIG. 6 | FIG. 7 | | | | | |
| Weight reduction (wt %) | 10.1 | 12.4 | | | | | |
| Condition of dispersion | Elution of islands | Elution of islands | | | | | |
| Details | 110 holes with diameter of approximately 0.1 to 1.4 μm present in 5 μm × 5 μm area, large holes are 3 dimensionally linked | 100 holes with diameter of approximately 0.1 to 1.0 μm present in 5 μm × 5 μm area, large holes are 3 dimensionally linked | | | | | |

TABLE 4-2

| | Embodiment 14 | Embodiment 15 | Comparative Example 4 | Comparative Example 5 | Comparative Example 6 | Comparative Example 7 |
|---|---|---|---|---|---|---|
| Screw type | (3) | (3) | (1) | (1) | (1) | (2) |
| Rotational speed (rpm) | 400 | 400 | 400 | 400 | 200 | 400 |
| Feed (g/minute) | 60 | 30 | 160 | 340 | 340 | 160 |
| Temperature (° C.) | | | | | | |
| C1 to C6 | 250 | 250 | 250 | 250 | 250 | 250 |
| C7 to C12 | 250 | 200 | 250 | 250 | 250 | 250 |
| PLLA | PLLA-1 | PLLA-1 | PLLA-1 | PLLA-1 | PLLA-1 | PLLA-1 |
| PDLA | PDLA-1 | PDLA-2 | PDLA-2 | PDLA-2 | PDLA-2 | PDLA-2 |
| PLLA molecular weight | 183,000 | 183,000 | 183,000 | 183,000 | 183,000 | 183,000 |
| PDLA molecular weight | 223,000 | 223,000 | 223,000 | 223,000 | 223,000 | 223,000 |
| Average molecular weight | 203,000 | 203,000 | 203,000 | 203,000 | 203,000 | 203,000 |
| Formulation ratio (PLLA/PDLA) | 50/50 | 50/50 | 50/50 | 50/50 | 50/50 | 50/50 |
| Molecular weight of blend | 114,000 | 113,000 | 143.000 | 160,000 | 178,000 | 155,000 |
| Molecular weight before and after kneading | 0.45 | 0.56 | 0.70 | 0.79 | 0.88 | 0.76 |
| SEM dispersion observation (press sheet) | | | | | | |
| After 13 days | | | FIG. 8 | | | |
| Weight reduction (wt %) | | | 19.8 | | | |
| Condition of dispersion | | | General elusion | | | |
| Details | | | 6 particles with diameter of approximately 1 to 200 μm present in 5 μm × 5 μm area | | | |
| After 38 days | | | FIG. 9 | | | |
| Weight reduction (wt %) | | | 29.7 | | | |
| Condition of dispersion | | | General elusion | | | |

TABLE 4-2-continued

|  | Embodiment 14 | Embodiment 15 | Comparative Example 4 | Comparative Example 5 | Comparative Example 6 | Comparative Example 7 |
|---|---|---|---|---|---|---|
| Details |  |  | 8 particles with diameter of approximately 0.5 to 200 μm present in 5 μm × 5 μm area |  |  |  |

TABLE 4-3

|  | Comparative example 8 | Comparative example 9 | Reference example 4 | Reference example 5 |
|---|---|---|---|---|
| Screw type | (2) | (3) |  |  |
| Rotational speed (rpm) | 400 | 400 |  |  |
| Feed (g/minute) | 340 | 160 |  |  |
| Temperature (° C.) |  |  |  |  |
| C1 to C6 | 250 | 250 |  |  |
| C7 to C12 | 250 | 250 |  |  |
| PLLA | PLLA-1 | PLLA-1 | PLLA-1 |  |
| PDLA | PDLA-2 | PDLA-2 |  | PDLA-2 |
| PLLA molecular weight | 183,000 | 183,000 | 183,000 |  |
| PDLA molecular weight | 223,000 | 223,000 |  | 223,000 |
| Average molecular weight | 203,000 | 203,000 |  |  |
| Formulation ratio (PLLA/PDLA) | 50/50 | 50/50 |  |  |
| Molecular weight of blend | 163,000 | 139,000 | 183,000 | 223,000 |
| Molecular weight before and after kneading | 0.80 | 0.68 |  |  |
| SEM dispersion observation (press sheet) |  |  | FIG. 10 | FIG. 11 |
| After 13 days Weight reduction (wt %) |  |  | 7.0 | 0.8 |
| Condition of dispersion |  |  | Slight elution | No elution |
| Details |  |  | 1 hole with diameter of approximately 0.5 μm present in 5 μm × 5 μm area (planar) | No change |

TABLE 4-4

|  | Embodiment 7 | Embodiment 8 | Embodiment 9 | Embodiment 10 | Embodiment 11 | Embodiment 12 | Embodiment 13 |
|---|---|---|---|---|---|---|---|
| 1. Evaluation of Composition (DSC) first cooling |  |  |  |  |  |  |  |
| ΔHc (J/g) | 40.0 | 28.9 | 46.0 | 23.8 | 37.9 | 26.6 | 46.3 |
| second heating |  |  |  |  |  |  |  |
| ΔHm SC (J/g) | 48.3 | 35.8 | 48.5 | 35.5 | 44.8 | 37.0 | 49.7 |
| ΔH α (J/g) | 0 | 1.6 | 5.6 | 5.2 | 3.6 | 5.0 | 2.0 |
| second heating peak height (W/g) |  |  |  |  |  |  |  |
| Tm = 150 to 180° C. | 0 | 0.029 | 0.030 | 0.068 | 0.015 | 0.077 | 0.003 |
| Tm = 200 to 250° C. | 0.776 | 0.500 | 0.763 | 0.456 | 0.618 | 0.467 | 0.695 |
| Ratio of peak heights | 0 | 0.058 | 0.039 | 0.149 | 0.024 | 0.175 | 0.004 |

TABLE 4-4-continued

|  | Embodiment 7 | Embodiment 8 | Embodiment 9 | Embodiment 10 | Embodiment 11 | Embodiment 12 | Embodiment 13 |
|---|---|---|---|---|---|---|---|
| 2. Evaluation of moldings(stretch film) |  |  |  |  |  |  |  |
| (1) Transparency |  |  |  |  |  |  |  |
| HZ (%) |  | 3.2 | 7.4 | 5.8 |  |  |  |
| Pt (%) |  | 90.0 | 85.4 | 86.3 |  |  |  |
| (2) Tensile test |  |  |  |  |  |  |  |
| Breaking strain (MPa) |  | 67 | 68 | 66 |  |  |  |
| Elongation at breaking (%) |  | 9 | 9 | 6 |  |  |  |
| Breaking energy (mJ) |  | 0.15 | 0.15 | 0.10 |  |  |  |
| Young's modulus ($\times 10^3$) (MPa) |  | 2271 | 2270 | 2255 |  |  |  |
| (3) Thermal resistance test |  |  |  |  |  |  |  |
| Evaluation of thermal resistance (10% deformation temperature) (° C.) |  | 188.1 | 177.4 | 185.1 |  |  |  |
| Ratio of change in thermal deformation test (TMA) (%) |  |  |  |  |  |  |  |
| 100° C. |  | 1.5 | 1.7 | 1.5 |  |  |  |
| 120° C. |  | 2.3 | 2.9 | 2.5 |  |  |  |
| 140° C. |  | 3.2 | 4.3 | 3.7 |  |  |  |
| 160° C. |  | 4.5 | 6.8 | 5.5 |  |  |  |
| 180° C. |  | 7.4 | 10.7 | 8.8 |  |  |  |
| 200° C. |  | 21.9 | 24.3 | 21.6 |  |  |  |
| 220° C. |  | Measurement limit | Measurement limit | Measurement limit |  |  |  |

TABLE 4-5

|  | Embodiment 14 | Embodiment 15 | Comparative Example 5 | Comparative Example 6 | Comparative Example 7 |
|---|---|---|---|---|---|
| 1. Evaluation of Composition (DSC) |  |  |  |  |  |
| first 8 cooling ΔHc (J/g) | 28.5 | 34.1 | 5.1 | 2.1 | 8.9 |
| second heating ΔHm SC (J/g) | 41.8 | 43.7 | 20.2 | 12.2 | 22.7 |
| ΔH α (J/g) | 2.1 | 3.8 | 17.3 | 21.9 | 29.6 |
| second heating peak height (W/g) |  |  |  |  |  |
| Tm = 150 to 180° C. | 0.024 | 0.051 | 0.284 | 0.398 | 0.267 |
| Tm = 200 to 250° C. | 0.569 | 0.551 | 0.203 | 0.123 | 0.239 |
| Ratio of peak heights | 0.042 | 0.093 | 1.399 | 3.236 | 1.117 |

TABLE 4-5-continued

| | Embodiment 14 | Embodiment 15 | Comparative Example 5 | Comparative Example 6 | Comparative Example 7 |
|---|---|---|---|---|---|
| 2. Evaluation of moldings (stretch film) | | | | | |
| (1) Transparency | | | | | |
| HZ (%) | | 16.3 | 28.0 | | |
| Pt (%) | | 75.7 | 63.9 | | |
| (2) Tensile test | | | | | |
| Breaking strain (MPa) | | 64 | 65 | | |
| Elongation at breaking (%) | | 7 | 6 | | |
| Breaking energy (mJ) | | 0.11 | 0.10 | | |
| Young's modulus (MPa) | | 2257 | 2236 | | |
| (3) Thermal resistance test | | | | | |
| Evaluation of thermal resistance (10% deformation temperature) (° C.) | | 163.2 | 161.5 | | |
| Ratio of change in thermal deformation test (TMA) (%) | | | | | |
| 100° C. | | 2.3 | 2.3 | | |
| 120° C. | | 3.4 | 3.2 | | |
| 140° C. | | 4.9 | 4.6 | | |
| 160° C. | | 8.6 | 8.8 | | |
| 180° C. | | 24.9 | Measurement limit | | |
| 200° C. | | Measurement limit | Measurement limit | | |
| 220° C. | | Measurement limit | Measurement limit | | |

TABLE 4-6

| | Comparative Example 8 | Comparative Example 9 | Reference Example 4 | Reference Example 5 |
|---|---|---|---|---|
| 1. Evaluation of Composition (DSC) first cooling | | | | |
| ΔHc (J/g) | 8.1 | 13.6 | | |
| second heating | | | | |
| ΔHm SC (J/g) | 20.1 | 29.1 | | |
| ΔH α (J/g) | 32.8 | 24.0 | | |
| second heating peak height (W/g) | | | | |
| Tm = 150 to 180° C. | 0.284 | 0.244 | 0.551 | 0.553 |
| Tm = 200 to 250° C. | 0.215 | 0.350 | 0.0 | 0.0 |
| Ratio of peak heights | 1.321 | 0.697 | Cannot be calculated | Cannot be calculated |

As can be seen from Table 4, the molecular weight of embodiments 7 through 15 was reduced to 120,000 or below by kneading, and the results of the evaluation of the composition using a DSC showed that during the second heating, ΔHsc was 35 mJ/mg or higher, and furthermore, the ratio of the peaks (peak 1/peak 2) at Tm=150 to 180° C. (peak 1) and Tm=200 to 250° C. (peak 2) was 0.2 or less, and it is understood that this composition can more easily form stereocomplex structures than can comparative examples 4 through 9 which were outside of this range.

Furthermore, when the press sheets of embodiments 7 and 8 were degraded by an enzyme for 48 days and then observed by SEM, a matrix of islands had eluted, small holes with a diameter between approximately 0.1 and 1.0 µm were formed, and the PLLA and PDLA were sufficiently dispersed, but the press sheet of comparison example 4 eluted generally, and a matrix of islands (thought to be PDLA) with a diameter between approximately 1 and 200 µm were floating, and it was understood that dispersion of the PLLA and PDLA was insufficient.

Furthermore, when the biaxial stretching of embodiments 7 through 9 and comparative examples 4 through 6 were compared, the haze of embodiments 7 through 9 was smaller than comparative examples 4 through 6, so the transparency was higher, the thermal resistance temperature was higher, and the film could be elongated at 200° C. without breaking and without reaching the measurement limit.

Embodiment 16

Manufacturing the Polylactic Acid Composition

An approximately 300 µm non-stretch sheet was prepared by measuring a 50:50 ratio (wt %) of PLLA-1:PDLA-1, and then kneading and extruding using a unirotational twin screw kneader extruder manufactured by Toshiba Machine Co. Ltd. (TEM-37BS screw diameter: 37 mm, number of screws: 2, screw length (l/d): 42, a screw pattern consisting of a screw region: 882 mm and a mixing region: 644 mm) at a feed rate of 120 g/minute, under conditions of C1 through C12: 250° C., and 430 rpm, and furthermore, the leading edge thereof was inserted and secured together with a 0.5 mm thick tin alloy plate into the lip of a coat hanger shaped T die with a width of 400 mm using a single screw kneader extruder (SE-50C, screw diameter: 50 mm, screw length (l/d): 28), and then forming with a width of 280 mm, using a mirror surface polish chill roller (water temperature: 15° C.) at a speed of 1.0 m/minute.

This non-stretch sheet was stretched and heat set using a biaxial stretching machine manufactured by Brueckner Corp. A feeder for the stretching device was placed in front of the MDO (longitudinal stretching process) and the non-stretch sheet was continuously fed. This biaxial stretching device is equipped with an extruder and die, but the device is not a twin screw extruder, so the non-stretch sheet which is formed separately in the aforementioned process is moved when used. Furthermore the feeding speed was 2 m/minute, the MDO stretched to a factor of 3 at 65° C., and the TDO (lateral stretch process) stretched to a factor of 3 at a temperature of 70° C., and then heat setting was performed in a tenter at 200° C. for approximately 40 seconds.

The results are shown in Table 5.

TABLE 5

|  | Embodiment 16 |
|---|---|
| 1. Evaluation of Composition (DSC) first cooling | |
| ΔHc (J/g) | 29.0 |
| second heating | |
| ΔHm SC (J/g) | 48.3 |
| ΔH α (J/g) | 0 |
| second heating peak height (W/g) | |
| Tm = 150 to 180° C. | 0 |
| Tm = 200 to 250° C. | 0.776 |
| Ratio of peak heights | 0 |

TABLE 5-continued

|  | Embodiment 16 |
|---|---|
| 2. Evaluation of moldings (1) Transparency | |
| Haze (Hz) (%) | 0.4 |
| Parallel light transmissivity Pt (%) | 92.7 |
| (2) Tensile test | |
| Breaking strain (MPa) | 140 |
| Elongation at breaking (%) | 100 |
| Breaking energy (mJ) | |
| Young's modulus (MPa) | 2700 |
| (3) Thermal resistance test | |
| Evaluation of thermal resistance (10% deformation temperature) (° C.) | 205.2 |
| Ratio of change in thermal deformation test (TMA) (%) | |
| 100° C. | −0.6 |
| 120° C. | −0.7 |
| 140° C. | −0.8 |
| 160° C. | −1.2 |
| 180° C. | −4.0 |
| 200° C. | −7.0 |
| 220° C. | Outside measurement limits |

The DSC of the non-stretch sheet discharged from the die was measured. By looking at the height of the second heating peak, it can be seen that there was no peak in the range Tm 200 to 250° C., and that the composition selectively produced stereocomplex crystals.

Furthermore, a stretched sheet that was continuously formed from this composition as described above (embodiment 16) had high transparency, sufficient toughness for practical use, and thermal resistance that was at least 200° C.

Embodiment 17a

Manufacturing the Polylactic Acid Composition

A polylactic acid composition (composition 8) was obtained by measuring 80 g of PLLA-1:PDLA-1 at a ratio of 50:50 (weight %), melting and kneading for 15 minutes at 250° C. and 60 rpm using a Model C Laboplast mill manufactured by Toyo Seiki Seisakusho Co., Ltd. (twin screw kneader).

<Production of Press Sheet>

A press sheet (press sheet 2) was obtained by placing composition 8 between 50 µm thick polyamide films (product name: Upirex 50S, manufactured by Ube Industries, Ltd.) which was then placed in a 270 mm×270 mm stainless steel rectangular mold frame with a thickness of 0.5 mm, and press molding under conditions of: press temperature: 250° C., initial pressure: 3 minutes (pressure 0), gas purge: 5 times, press time: 4 minutes (pressure 100 kgf), cooling: 5 minutes (pressure 10 kgf).

<Production of Biaxial Stretch>

A 50 µm thick biaxial stretch was obtained by preheating a press sheet 2 for 50 seconds by 60° C. hot air using a pantograph type batch biaxial stretching device (Heavy model manufactured by Toyo Seiki Seisakusho Co., Ltd.), stretching to a factor of 3.0 in the longitudinal and lateral directions at a speed of 5 m/minute (simultaneous biaxial stretching), and then immediately cooling the stretch film using a fan.

Next, the biaxial stretch film obtained was secured by clips in a metal frame and heat set (heat treated) at conditions of 200° C.×30 seconds, and then sufficiently cooled to room temperature to obtain a polylactic acid based biaxial stretch.

Embodiment 17b

Preparation was similar to embodiment 17a, except that the kneading time was changed to 3 minutes.

The polylactic acid based biaxial stretch film that was obtained was evaluated by the aforementioned methods. Evaluation results are shown in Table 6.

TABLE 6

| Composition | | Embodiment 17a | Embodiment 17b |
|---|---|---|---|
| PLLA-1 | (wt %) | 50 | 50 |
| PDLA-1 | (wt %) | 50 | 50 |
| (1) Kneading conditions | | | |
| Kneading temperature | (° C.) | 250 | 250 |
| Kneading speed | (rpm) | 60 | 60 |
| Kneading time | (minutes) | 15 | 3 |
| (2) DSC measurement results | | | |
| Press Sheet first heating | | | |
| ΔHm1 | (J/g) | 0 | 23.4 |
| ΔHm2 | (J/g) | 56.6 | 18.6 |
| Peak height (Tm = 150 to 180° C.) | (W/g) | 0 | 0.304 |
| Peak height (Tm = 200 to 250° C.) | (W/g) | 0.723 | 0.234 |
| Ratio of peak heights | (—) | 0 | 1.299 |
| first cooling | | | |
| ΔHc | (J/g) | 61.7 | 15.1 |
| second heating | | | |
| ΔHm1 | (J/g) | 0 | 10 |
| ΔHm2 | (J/g) | 62.1 | 24.5 |
| Peak height (Tm = 150 to 180° C.) | (W/g) | 0 | 0.116 |
| Peak height (Tm = 200 to 250° C.) | (W/g) | 0.936 | 0.304 |
| Ratio of peak heights | (—) | 0 | 0.382 |
| Stretch film (200° C. × 30 minutes heat treatment) first heating | | | |
| ΔHm1 | (J/g) | 0 | 5.9 |
| ΔHm2 | (J/g) | 80.9 | 56.9 |
| Peak height (Tm = 150 to 180° C.) | (W/g) | 0 | 0.067 |
| Peak height (Tm = 200 to 250° C.) | (W/g) | 0.785 | 0.736 |
| Ratio of peak heights | (—) | 0 | 0.091 |
| Physical properties of stretch film | | | |
| Breaking point stress | (MPa) | 93 | 58 |
| Breaking point elongation | (%) | 10 | 4 |
| Young's modulus | (MPa) | 2500 | 2000 |
| Haze (HZ) | | 3 | 46 |
| Parallel light transmissivity (PT) | | 90 | 50 |
| Surface roughness | | 0.04 | 0.23 |
| Evaluation of thermal resistance | | | |
| Temperature at 5% deformation | (° C.) | 196 | 171 |
| Temperature at 10% deformation | (° C.) | 205 | 203 |

As can be seen from Table 6, the stretch films of embodiment 17a was made from press sheet 2 for which in the DSC measurement of the press sheet, the peak during cooling (10° C./minute) after a 10 minute soak was equal to or greater than 45 J/g, and there were no peaks for Tm=150 to 180° C. during the second heating, and this film had excellent smoothness with a surface roughness (SRa) no greater than 0.1 μm, and excellent transparency with a haze of 3%.

On the other hand, with embodiment 17b, the ΔHm2 was high at 56 J/g and the ratio of the peak heights was 0.1 or less during DSC measurements after stretching and after heat treating at 200° C.×30 minutes, indicating the generation of a large quantity of stereocomplex crystals, but when the physical properties of the films were compared, embodiment 17a had superior film strength, haze, surface roughness, and thermal resistance compared to embodiment 17b.

When DSC measurements were made of the press sheet of embodiment 17b, the ΔHc during the first cooling was low at 15 J/g, and the peak height was high at 1.2 or greater. It is hypothesized that this is because this composition did not easily form stereocomplex crystals, but that stereocomplex crystals were later formed during the processes of stretching and heat treating at 200° C.×30 minutes, and therefore there was a relaxation of orientation and an increase in the noncrystalline regions. In other words, by postprocessing (stretching, heat treatment), stereocomplex crystals will form even in a composition where the PLLA and PDLA which have difficulty forming stereocomplex are not sufficiently kneaded, but the physical properties of the molding will not match those of moldings obtained by sufficiently kneading the PLLA and PDLA.

Embodiment 18

Manufacturing Chips for Injection Molding

A sheet with the thickness of approximately 300 μm produced from embodiment 16 was crushed and press formed to a thickness of approximately 1 mm using a press molder at 250° C. for 5 minutes, and then cut to make the raw material.

<Injection Molding>

Molding was performed under the following conditions using an injection molder model Ti-80 manufactured by Toyo Machinery and Metal Co. Ltd. The mold that was used was for 3 mm thick specimens.

Cylinder temperature: C1(leading edge)/C2/C3/C4/C5 (hopper side)=215/215/215/215/235 (° C.)
Mold temperature: 130 (° C.)
Crystallization time in mold: 1 (minute)
Speed at switching position 0 to 40 mm: 50(%) pressure: 30 (kgf), timer: 5 (seconds)
Speed at switching position 40 to 40 mm: 50(%) pressure: 30 (kgf), timer: 10 (seconds)
Speed at switching position 40 to 70 mm: 50(%), pressure: 30 (kgf), timer: 4 (seconds)
Speed at charge position 70 mm: 50(%) timer: 10 (seconds)
Suck back (position 0 mm): 50(%), timer: 170 (seconds)

Embodiment 19

Preparation was similar to embodiment 18, except that the mold temperature was set to 120° C.

Embodiment 20

Preparation was similar to embodiment 18, except that the mold temperature was set to 120° C. and the mold crystallization time was set to 3 (minutes).

Embodiment 21

Preparation was similar to embodiment 18, except that the mold temperature was set to 110° C. and the mold crystallization time was set to 3 (minutes).

Comparative Example 10

Preparation was similar to embodiment 18, except that the cylinder temperature was set to C1(leading edge)/C2/C3/C4/C5 (hopper side)=250/250/250/250/250 (° C.), and the mold temperature was set to 60° C.

Comparative Example 11

Preparation was similar to embodiment 18, except that the cylinder temperature was set to C1 (leading edge)/C2/C3/C4/C5 (hopper side)=250/250/250/250/250 (° C.), and the mold temperature was set to 80° C.

Comparative Example 12

Preparation was similar to embodiment 18, except that the cylinder temperature was set to C1 (leading edge)/C2/C3/C4/C5 (hopper side)=250/250/250/250/250 (° C.), and the mold temperature was set to 80° C. and the mold crystallization time was set to 3 (minutes).

Comparative Example 13

Preparation was similar to embodiment 18, except that the cylinder temperature was set to C1(leading edge)/C2/C3/C4/C5 (hopper side)=250/250/250/250/250 (° C.), and the mold temperature was set to 90° C. and the mold crystallization time was set to 3 (minutes).

Comparative Example 14

Preparation was similar to embodiment 18, except that the cylinder temperature was set to C1(leading edge)/C2/C3/C4/C5 (hopper side)=250/250/250/250/250 (° C.), and the mold temperature was set to 100° C. and the mold crystallization time was set to 3 (minutes).

Comparative Example 15

Preparation was similar to embodiment 18, except that the cylinder temperature was set to C1(leading edge)/C2/C3/C4/C5 (hopper side)=230/230/230/250/250 (° C.), and the mold temperature was set to 100° C. and the mold crystallization time was set to 3 (minutes).

Comparative Example 16

Preparation was similar to embodiment 18, except that the cylinder temperature was set to C1 (leading edge)/C2/C3/C4/C5 (hopper side)=225/225/225/235/235 (° C.), and the mold temperature was set to 100° C. and the mold crystallization time was set to 3 (minutes).

Comparative Example 17

Preparation was similar to embodiment 18, except that the cylinder temperature was set to C1(leading edge)/C2/C3/C4/C5 (hopper side)=225/225/225/235/235 (° C.), and the mold temperature was set to 100° C. and the mold crystallization time was set to 1 (minutes).

Comparative Example 18

Preparation was similar to embodiment 18, except that the cylinder temperature was set to C1 (leading edge)/C2/C3/C4/C5 (hopper side)=225/225/225/235/235 (° C.), and the mold temperature was set to 80° C. and the mold crystallization time was set to 1 (minutes).

Comparative Example 19

Preparation was similar to embodiment 18, except that the cylinder temperature was set to C1(leading edge)/C2/C3/C4/C5 (hopper side)=225/225/225/235/235 (° C.), and the mold temperature was set to 20° C. and the mold crystallization time was set to 3 (minutes).

Comparative Example 20

Preparation was similar to embodiment 18, except that PLLA-1 monoisomer was used in place of crushing and pressing a non-stretch sheet made of PLLA-1:PDLA1=50:50 (wt %), and the cylinder temperature was set to C1 (leading edge)/C2/C3/C4/C5 (hopper side)=200/200/200/200/200 (° C.), and the mold temperature was set to 100° C. and the mold crystallization time was set to 1 (minute).

Comparative Example 21

This shows an example of heating comparative example 20 in the open at 120° C.×5 minutes.

Comparative Example 22

Preparation was similar to embodiment 18, except that pellets of PLLA-1:talc (P4 manufactured by Nippon Talc Co. Ltd.)=70:30 (weight ratio) were first prepared by kneading in a twin screw extruder and used in place of crushing and pressing a non-stretch sheet made of PLLA-1:PDLA-1=50:50 (wt %), and the cylinder temperature was set to C1(leading edge)/C2/C3/C4/C5 (hopper side)=200/200/200/200/200 (° C.), and the mold temperature was set to 100° C. and the mold crystallization time was set to 1 (minute).

Comparative Example 23

This shows an example of further heating comparative example 22 in the open at 120° C.×5 minutes.

TABLE 7

| | Embodiment 18 | Embodiment 19 | Embodiment 20 | Embodiment 21 | Comparative example 10 |
|---|---|---|---|---|---|
| PLLA | PLLA-1 | PLLA-1 | PLLA-1 | PLLA-1 | PLLA-1 |
| PDLA | PDLA-1 | PDLA-1 | PDLA-1 | PDLA-1 | PDLA-1 |
| PLLA molecular weight | 183,000 | 183,000 | 183,000 | 183,000 | 183,000 |

TABLE 7-continued

|  | | | | | |
|---|---|---|---|---|---|
| PDLA molecular weight | 223,000 | 223,000 | 223,000 | 223,000 | 223,000 |
| Average molecular weight | 203,000 | 203,000 | 203,000 | 203,000 | 203,000 |
| Formulation ratio (PLLA/PDLA) | 50/50 | 50/50 | 50/50 | 50/50 | 50/50 |
| Talc content (%) | 0 | 0 | 0 | 0 | 0 |
| Twin screw kneading and sheet forming conditions | Same as embodiment 16 | Same as embodiment 16 | Same as embodiment 16 | Same as embodiment 16 | Same as embodiment 16 |
| 2. Injection molding conditions (1) Cylinder temperature (°C.) | | | | | |
| C1 | 215 | 215 | 215 | 215 | 250 |
| C2 | 215 | 215 | 215 | 215 | 250 |
| C3 | 215 | 215 | 215 | 215 | 250 |
| C4 | 215 | 215 | 215 | 215 | 250 |
| C5 | 235 | 235 | 235 | 235 | 250 |
| (2) Mold conditions | | | | | |
| Temperature (°C.) | 130 | 120 | 120 | 110 | 60 |
| Time (minutes) | 1 | 1 | 3 | 3 | 1 |
| (3) Heat treatment | None | None | None | None | None |
| 3. Mold opening property | Good | Good | Good | Good | Good |
| 4. Evaluation results of molding (1) Evaluation of composition (DSC) | | | | | |
| ΔHc (J/g) | 0 | | | | 28.9 |
| ΔHm SC (J/g) | 53.8 | | | | 55.5 |
| ΔH α (J/g) | 0 | | | | 0 |
| (2) Transparency | | | | | |
| HZ (%) | 60 | | | | |
| TT (%) | 84 | | | | |
| PT (%) | 30 | | | | |
| (3) Tensile strength | | | | | |
| Breaking stress (MPa) | 37 | | | | |
| Breaking elongation (%) | 1 | | | | |

|  | Embodiment 11 | Embodiment 12 | Embodiment 13 | Embodiment 14 | Embodiment 15 |
|---|---|---|---|---|---|
| PLLA | PLLA-1 | PLLA-1 | PLLA-1 | PLLA-1 | PLLA-1 |
| PDLA | PDLA-1 | PDLA-1 | PDLA-1 | PDLA-1 | PDLA-1 |
| PLLA molecular weight | 183,000 | 183,000 | 183,000 | 183,000 | 183,000 |

TABLE 7-continued

| | | | | | |
|---|---|---|---|---|---|
| PDLA molecular weight | 223,000 | 223,000 | 223,000 | 223,000 | 223,000 |
| Average molecular weight | 203,000 | 203,000 | 203,000 | 203,000 | 203,000 |
| Formulation ratio (PLLA/PDLA) | 50/50 | 50/50 | 50/50 | 50/50 | 50/50 |
| Talc content (%) | 0 | 0 | 0 | 0 | 0 |
| Twin screw kneading and sheet forming conditions | Same as embodiment 16 | Same as embodiment 16 | Same as embodiment 16 | Same as embodiment 16 | Same as embodiment 16 |
| 2. Injection molding conditions (1) Cylinder temperature (° C.) | | | | | |
| C1 | 250 | 250 | 250 | 250 | 230 |
| C2 | 250 | 250 | 250 | 250 | 230 |
| C3 | 250 | 250 | 250 | 250 | 230 |
| C4 | 250 | 250 | 250 | 250 | 250 |
| C5 | 250 | 250 | 250 | 250 | 250 |
| (2) Mold conditions | | | | | |
| Temperature (° C.) | 80 | 80 | 90 | 100 | 100 |
| Time (minutes) | 1 | 3 | 3 | 3 | 3 |
| (3) Heat treatment | None | None | None | None | None |
| 3. Mold opening property | Poor | Poor | Poor | Poor | Poor |

| | Comparative example 16 | Comparative example 17 | Comparative example 18 | Comparative example 19 | Comparative example 20 |
|---|---|---|---|---|---|
| PLLA | PLLA-1 | PLLA-1 | PLLA-1 | PLLA-1 | PLLA-1 |
| PDLA | PDLA-1 | PDLA-1 | PDLA-1 | PDLA-1 | |
| PLLA molecular weight | 183,000 | 183,000 | 183,000 | 183,000 | 183,000 |
| PDLA molecular weight | 223,000 | 223,000 | 223,000 | 223,000 | |
| Average molecular weight | 203,000 | 203,000 | 203,000 | 203,000 | |
| Formulation ratio (PLLA/PDLA) | 50/50 | 50/50 | 50/50 | 50/50 | 100/0 |
| Talc content (%) | 0 | 0 | 0 | 0 | 0 |
| Twin screw kneading and sheet forming conditions | Same as embodiment 16 | Same as embodiment 16 | Same as embodiment 16 | Same as embodiment 16 | |
| 2. Injection molding conditions (1) Cylinder temperature (° C.) | 225 | 225 | 225 | 225 | 200 |
| C1 | 225 | 225 | 225 | 225 | 200 |
| C2 | 225 | 225 | 225 | 225 | 200 |
| C3 | 225 | 225 | 225 | 225 | 200 |
| C4 | 235 | 235 | 235 | 235 | 200 |
| C5 | 235 | 235 | 235 | 235 | 200 |

TABLE 7-continued

| | | | | | |
|---|---|---|---|---|---|
| (2) Mold conditions | | | | | |
| Temperature (° C.) | 100 | 100 | 80 | 80 | 100 |
| Time (minutes) | 3 | 1 | 1 | 3 | 1 |
| (3) Heat treatment | None | None | None | None | None |
| 3. Mold opening property | Poor | Poor | Poor | Poor | Poor |
| 4. Evaluation results of molding | | | | | |
| (1) Evaluation of composition (DSC) first heating | | | | | |
| $\Delta Hc$ (J/g) | | | | | 30 |
| $\Delta Hm$ SC (J/g) | | | | | 0 |
| $\Delta H\alpha$ (J/g) | | | | | 30 |
| (2) Transparency | | | | | |
| Haze (HZ) (%) | | | | | 13 |
| Total light transmissivity (TT) (%) | | | | | 86 |
| Parallel light transmissivity (PT) (%) | | | | | 12 |
| (3) Tensile strength | | | | | |
| Breaking stress (MPa) | | | | | 82 |
| Breaking elongation (%) | | | | | 3 |

| | Comparative example 21 | Comparative example 22 | Comparative example 23 |
|---|---|---|---|
| PLLA | PLLA-1 | PLLA-1 | PLLA-1 |
| PDLA | | | |
| PLLA molecular weight | 183,000 | 183,000 | 183,000 |
| PDLA molecular weight | | | |
| Average molecular weight | | | |
| Formulation ratio (PLLA/PDLA) | 100/0 | 100/0 | 100/0 |
| Talc content (%) | 0 | 30 | 30 |
| Twin screw kneading and sheet forming conditions | | | |
| 2. Injection molding conditions | | | |
| (1) Cylinder temperature (° C.) | | | |
| C1 | 200 | 200 | 200 |
| C2 | 200 | 200 | 200 |
| C3 | 200 | 200 | 200 |
| C4 | 200 | 200 | 200 |
| C5 | 200 | 200 | 200 |

TABLE 7-continued

|  | | | |
|---|---|---|---|
| (2) Mold conditions | | | |
| Temperature (° C.) | 100 | 100 | 100 |
| Time (minutes) | 1 | 1 | 1 |
| (3) Heat treatment | 120° C. × 5 minutes | | 120° C. × 5 minutes |
| 3. Mold opening property | Poor | Poor | Poor |
| 4. Evaluation results of molding | | | |
| (1) Evaluation of composition (DSC) first heating | | | |
| ΔHc (J/g) | 24 | 8 | 0 |
| ΔHm SC (J/g) | 0 | 0 | 0 |
| ΔH α (J/g) | 24 | 29 | 33 |
| (2) Transparency | | | |
| Haze (HZ) (%) | 81 | 99 | 100 |
| Total light transmissivity (TT) (%) | 88 | 12 | 11 |
| Parallel light transmissivity (PT) (%) | 17 | 0 | 0 |
| (3) Tensile strength | | | |
| Breaking stress (MPa) | 75 | 54 | 57 |
| Breaking elongation (%) | 3 | 7 | 4 |

|  | Comparative example 21 | Comparative example 22 | Comparative example 23 |
|---|---|---|---|
| PLLA | PLLA-1 | PLLA-1 | PLLA-1 |
| PDLA | | | |
| PLLA molecular weight | 183,000 | 183,000 | 183,000 |
| PDLA molecular weight | | | |
| Average molecular weight | | | |
| Formulation ratio (PLLA/PDLA) | 100/0 | 100/0 | 100/0 |
| Talc content (%) | 0 | 30 | 30 |
| Twin screw kneading and sheet forming conditions | | | |
| 2. Injection molding conditions | | | |
| (1) Cylinder temperature (° C.) | | | |
| C1 | 200 | 200 | 200 |
| C2 | 200 | 200 | 200 |
| C3 | 200 | 200 | 200 |
| C4 | 200 | 200 | 200 |
| C5 | 200 | 200 | 200 |
| (2) Mold conditions | | | |
| Temperature (° C.) | 100 | 100 | 100 |
| Time (minutes) | 1 | 1 | 1 |
| (3) Heat treatment | 120° C. × 5 minutes | | 120° C. × 5 minutes |
| 3. Mold opening property | Poor | Poor | Poor |

TABLE 7-continued

| 4. Evaluation results of molding | | | |
|---|---|---|---|
| (1) Evaluation of composition (DSC) first heating | | | |
| ΔHc (J/g) | 24 | 8 | 0 |
| ΔHm SC (J/g) | 0 | 0 | 0 |
| ΔH α (J/g) | 24 | 29 | 33 |
| (2) Transparency | | | |
| Haze (HZ) (%) | 81 | 99 | 100 |
| Total light transmissivity (TT) (%) | 88 | 12 | 11 |
| Parallel light transmissivity (PT) (%) | 17 | 0 | 0 |
| (3) Tensile strength | | | |
| Breaking stress (MPa) | 75 | 54 | 57 |
| Breaking elongation (%) | 3 | 7 | 4 |

The results are shown in Table 7. As can be seen from the table, embodiment 18 through 21 were prepared by using a sufficiently kneaded sheet of 50:50 (wt %) PLLA-1 and PDLA-1 as the raw material, with a cylinder temperature C1 to C4 no greater than 220° C., and crystallization of these embodiments proceeded in the mold, so the mold opening property was favorable. Furthermore, the moldings did not show a peak of crystallization during the first heating and DSC measurements as did an embodiment 18, indicating nearly complete crystallization, and a melting peak was not observed in the range Tm=150 to 180° C., and only a melting peak in the range Tm=200 to 250° C. was observed, so the crystal structure in the molding had undergone stereocomplex crystallization. The transparency was superior compared to comparative examples 22 and 23 in which 30 wt % of calcium carbonate had been added to PLLA-1.

With comparative example 23 and comparative example 22, additional heat treatment was performed at 120° C.×5 minutes, and the ΔHc of the first heating according to the DSC measurement was lower, so it is thought that crystallization proceeded during the heat treatment and the thermal resistance would be improved, but the heat treatment is an additional process, so there would be additional costs.

Embodiment 22

Production of Sheet for Vacuum Molding

A sheet with a thickness of approximately 300 μm fabricated using embodiment 16 was used as the raw material.

<Vacuum Molding>

Molding was performed under the following conditions using a cut sheet test molder FKS-0631-20 manufactured by Asano Laboratories. The mold was a pudding mold with the top surface diameter of 82 mm, a bottom surface diameter of 55 mm, and a draw depth of 60 mm.

| (1) Time settings | |
|---|---|
| Upper table lowering delay: | 0.0 (seconds) |
| Vacuum delay: | 0.8 (seconds) |
| Air pressure delay: | 1.2 (seconds) |
| Lower table raising delay: | 0.2 (seconds) |
| Cooling air delay: | 0.0 (seconds) |
| Cooling time: | 60.0 (seconds) |
| Mold closing delay: | 0.5 (seconds) |
| Time of mold release 1: | 0.5 (seconds) |
| Air purge time: | 0.5 (seconds) |
| Time of mold release 2: | 0.0 (seconds) |
| Air purge time: | 0.5 (seconds) |
| Mold closing delay: | 60.0 (seconds) |
| Compressed air pressure: | 0.5 (seconds) |
| (2) Upper Table | |
| Open height: | 250.0 (mm) |
| Low speed position during lowering: | 157.0 (mm) |
| Shut height: | 94.0 (mm) |
| Lowering speed: | 100 (%) |
| Lowering low speed: | 100 (%) |
| Raising high speed: | 100 (%) |
| Raising low speed: | 3 (%) |
| High speed position during raising: | 150.0 (mm) |
| (3) Lower Table | |
| Shut height: | 115.0 (mm) |
| Low speed position during raising: | 220.0 (mm) |
| Open height: | 300.0 (mm) |
| Raising high speed: | 100 (%) |
| Raising low speed: | 100 (%) |
| Lowering speed: | 20 (%) |
| Raising low speed: | 100 (%) |
| High speed position during raising: | 200.0 (mm) |

This device is a batch type device separated into a (1) preheating section, and a (2) molding section. First, the sheet is heated in the (1) preheating section using an infrared heater, and when the surface temperature of the sheet has been preheated to a set value according to a radiation type thermometer, the sheet is transferred to the (2) molding section and molded between the cavity and the plug.

The temperature of the preheating heater was 300° C., and molding was performed when the surface temperature of the sheet had risen to 140° C. The preheat time was 21 seconds.

Furthermore, the set temperature of the cavity was 100° C., the set temperature of the plug was 100° C., and the molding time (retention time in the mold) was 60 seconds.

Embodiment 23

Preparation was similar to embodiment 22, except that the cavity set temperature was set to 140° C.

Embodiment 24

Preparation was similar to embodiment 22, except that the temperature of the preheat heater was set to 400° C., molding was performed when the surface temperature of the sheet had increased to 80° C., the cavity set temperature was 130° C., and the plug set temperature was 130° C.

Comparative Example 25

Preparation was similar to embodiment 22, except that the temperature of the preheating heater was 400° C., and molding was performed when the surface temperature of the sheet had risen to 100° C.

Comparative Example 26

Preparation was similar to embodiment 22, except that the temperature of the preheat heater was set to 400° C., molding was performed when the surface temperature of the sheet had increased to 100° C., the cavity set temperature was 120° C., and the plug set temperature was 120° C.

Comparative Example 27

Preparation was similar to embodiment 22, except that a sheet made from PLLA-1 monoisomer was used instead of using a sheet made from 50:50 (wt %) PLLA-1:PDLA-1.

Comparative Example 28

Preparation was similar to embodiment 22, except that a sheet made from PLLA-1 monoisomer was used instead of using a sheet made from 50:50 (wt %) PLLA-1:PDLA-1, the cavity set temperature was set to 40° C., and the plug set temperature was set to 40° C.

The results are shown in Table 8.

TABLE 8

|  | Embodiment 22 | Embodiment 23 | Embodiment 24 | Comparative example 25 | Comparative example 26 | Comparative example 27 | Comparative example 28 |
|---|---|---|---|---|---|---|---|
| PLLA | PLLA-1 | PLLA-1 | PLLA-1 | PLLA-1 | PLLA-1 | PLLA-1 | PLLA-1 |
| PDLA | PDLA-1 | PDLA-1 | PDLA-1 | PDLA-1 | PDLA-1 |  |  |
| PLLA molecular weight | 183,000 | 183,000 | 183,000 | 183,000 | 183,000 | 183,000 | 183,000 |
| PDLA molecular weight | 223,000 | 223,000 | 223,000 | 223,000 | 223,000 |  |  |
| Average molecular weight | 203,000 | 203,000 | 203,000 | 203,000 | 203,000 |  |  |
| Formulation ratio (PLLA/PDLA) | 50/50 | 50/50 | 50/50 | 50/50 | 50/50 | 100/0 | 100/0 |
| Twin screw kneading and sheet forming conditions | Same as embodiment 16 | Same as embodiment 16 | Same as embodiment 16 | Same as embodiment 16 | Same as embodiment 16 | Same as embodiment 16 | Same as embodiment 16 |
| 2. Vacuum molding conditions |  |  |  |  |  |  |  |
| (1) preheat heater temperature (° C.) | 300 | 300 | 400 | 400 | 400 | 300 | 300 |
| (2) Sheet surface temperature (° C.) | 140 | 140 | 80 | 100 | 100 | 140 | 140 |
| (3) Preheat time (seconds) | 21 | 21 | 10 | 11 | 11 | 21 | 21 |
| (4) Cavity set temperature (° C.) | 100 | 140 | 130 | 100 | 120 | 100 | 40 |
| (5) Plug set temperature (° C.) | 100 | 100 | 130 | 100 | 120 | 100 | 40 |
| (6) Molding time (seconds) | 60 | 10 | 60 | 60 | 60 | 60 | 60 |

TABLE 8-continued

|  | Embodiment 22 | Embodiment 23 | Embodiment 24 | Comparative example 25 | Comparative example 26 | Comparative example 27 | Comparative example 28 |
|---|---|---|---|---|---|---|---|
| 3. Evaluation results | | | | | | | |
| (1) Mold ability | ○ | ○ | Δ | ○ | X | X | ○ |
| (2) Thermal resistance | ○ | ○ | Δ | X | Not measurable | Not measurable | X |
| (3) Haze | 23 | 23 | 10 | 10 | Not measurable | Not measurable | 11 |

As can be seen from Table 8, embodiment 22 and embodiment 23 were prepared by using a sufficiently kneaded sheet of 50:50 (wt %) PLLA-1 and PDLA-1 as the raw material, and were partially crystallized by preheating over time, and although the haze was slightly higher, moldability and thermal resistance were excellent. On the other hand, comparative example 26 which was made from PLLA-1 mono isomer could not be molded under the same conditions because the molding in the cavity was soft and adhered to the cavity, but comparative example 27, where the plug temperature and the cavity temperature were reduced to room temperature in order to perform molding, did not have thermal resistance.

Furthermore, with embodiment 24 where the preheat heater temperature was increased and the preheat time was shortened, although the molding properties were unstable, a sample with low haze was obtained. The sample had excellent thermal resistance and did not deform significantly even when placed in hot water.

Embodiment 25

Fabrication of Solution (X)

An aqueous solution of zinc acrylate (zinc salts of acrylic acid) (product of Asada Chemical Industry Co. Ltd., concentration 30 wt % (acrylic acid content: 20 wt %, zinc content: 10 wt %)) photo initiator (1-[4-(2-hydroxyethoxy)-phenyl]-2-hydroxy-2-methyl-1-propan e-1-one (product of CIBA Specialty Chemicals, product name: Irgacure 2959)) diluted to 25 wt % with a methyl alcohol, and a surfactant (product of Kao Corp., product name: Emulgen 120) were blended at a molar ratio of 98.5%, 1.2%, 0.3% respectively, to prepare a polyvalent metal salt solution of an unsaturated carboxylate compound containing zinc acrylate solution (X).
<Silylated Vinyl Alcohol Polymer (B3)>
(7) Silylated Vinyl Alcohol Polymer; degree of polymerization, degree of saponification, product of Kuraray Co., Ltd., product name: R-1130 (B3-1)
<Fabrication of Barrier Coat Film>
The aforementioned zinc acrylate solution (X) was applied to the corona treated surface of the biaxial stretch of embodiment 16 using a Mayor bar coater at an application rate of 3.5 g/m² solid and dried using a hot air dryer. Next, the film was quickly attached to a stainless steel plate with the application surface up, and polymerized by irradiating with ultraviolet light at a UV intensity of 180 mW/cm² and a cumulative luminous energy of 180 mJ/cm² using a UV irradiation device (EYE GRANDAGE model ECS301G1, product of Eyegraphics Co., Ltd.) to obtain a gas barrier laminate film laminated with a gas barrier film.

The transparency and the oxygen permeability of the gas barrier laminate film obtained were measured. The results are shown in Table 9.

Embodiment 26

A 100 nm thick alumina coating was formed on the biaxial stretch of embodiment 16. At this time, alumina oxide was the vapor deposition source using an electron beam heating type vacuum vapor deposition device, and vapor deposition was performed while maintaining a vacuum in the vacuum chamber of 0.001 Torr or less.

Embodiment 27

A 300 nm thick aluminum coating was formed on the biaxial stretch of embodiment 16. At this time, aluminum was the vapor deposition source using an electron beam heating type vacuum vapor deposition device, and vapor deposition was performed while maintaining a vacuum in the vacuum chamber of 0.001 Torr or less.

Embodiment 28

A 100 nm thick silicon oxide coating was formed on the biaxial stretch of embodiment 16. At this time, a SiO:SiO$_2$=1:2 mixture was the vapor deposition source using an electron beam heating type vacuum vapor deposition device, and vapor deposition was performed while maintaining a vacuum in the vacuum chamber of 0.001 Torr or less.

The results are shown in Table 9.

TABLE 9

|  | Embodiment 25 | Embodiment 26 | Embodiment 27 | Embodiment 28 | Embodiment 16 |
|---|---|---|---|---|---|
| Base material | Same as embodiment 16 | Same as embodiment 16 | Same as embodiment 16 | Same as embodiment 16 | |
| Thickness of base material | 30 μm | 30 μm | 30 μm | 30 μm | 30 μm |

TABLE 9-continued

|  | Embodiment 25 | Embodiment 26 | Embodiment 27 | Embodiment 28 | Embodiment 16 |
|---|---|---|---|---|---|
| Coating film | Acrylic based polymer | Alumina | Aluminum | Silicon oxide | — |
| Film thickness | 1.7 μm | 300 angstroms | 300 angstroms | 300 angstroms |  |
| Barrier performance Vapor permeability (g/m² d) |  |  | 2 | 8 | 184 |
| Oxygen permeability (cc/m² d atm) | 0.1 | 0.7 | 0.6 | 0.5 | 56 |

As can be seen from Table 9, all of the films where a barrier film was applied onto embodiment 16 had improved barrier performance, and the barrier performance was at an acceptable level necessary for use as packaging for food or the like.

Embodiment 29

Production of Sheet for Stretch Molding

A sheet (non-stretch) with a thickness of approximately 300 μm fabricated using embodiment 16 was used as the raw material.
<Production of Biaxial Stretch>
A 30 μm thick biaxial stretch was obtained by preheating a sheet (non-stretch) with a thickness of approximately 300 μm for 60 seconds with 65° C. hot air using a pantograph type batch biaxial stretching device (manufactured by Brueckner), stretching to a factor of 3.0 in the longitudinal and lateral directions at a speed of 2.1 m/minute (simultaneous biaxial stretching), and then cooling for 30 seconds at room temperature.

Embodiment 30

Preparation was similar to embodiment 29, except that the hot air temperature during preheating was set to 70° C.

Embodiment 31

Preparation was similar to embodiment 29, except that the hot air temperature during preheating was set to 75° C.

Embodiment 32

Preparation was similar to embodiment 29, except that the hot air temperature during preheating was set to 80° C.

Embodiment 33

Preparation was similar to embodiment 29, except that the hot air temperature during preheating was set to 85° C.

Embodiment 34

Preparation was similar to embodiment 29, except that the hot air temperature during preheating was set to 90° C.

Reference Example 6

A non-stretch sheet with a thickness of approximately 30 μm was molded at the same time as embodiment 16 was fabricated. The sheet was evaluated in this condition.
The results are shown in Table 10.

TABLE 10

|  |  | Embodiment 29 | Embodiment 30 | Embodiment 31 | Embodiment 32 | Embodiment 33 | Embodiment 34 | Reference example 6 |
|---|---|---|---|---|---|---|---|---|
| Stretch temperature | (° C.) | 65 | 70 | 75 | 80 | 85 | 90 | None |
| Stretching factor | (times) | 3 × 3 | 3 × 3 | 3 × 3 | 3 × 3 | 3 × 3 | 3 × 3 | None |
| Thickness | (μm) | 30 | 31 | 30 | 30 | 30 | 30 | 30 |
| MD Direction Breaking stress | (MPa) | 150 | 145 | 115 | 42 | 33 | 59 | 41 |
| Breaking elongation | (%) | 83 | 127 | 142 | 45 | 20 | 3 | 5 |
| Young's modulus (×10³) | (MPa) | 3.47 | 3.32 | 3.36 | 3.33 | 2.76 | 2.43 | 1.85 |
| Planar degree of orientation (×10³) | (—) | 11.1 | 10.4 | 7.9 | — | 6.2 | 6.1 | 0.1 |

As can be seen from Table 10, the degree of orientation of embodiments 29 through 34 was in a range between 0.006 and 0.011, but the degree of orientation for reference example 1 which was not stretched was 0.0001. On the other hand, the physical properties such as the breaking stress, elongation, and Young's modulus of the film tended to increase as the planar degree of orientation increased, or in other words, as the stretching preheat temperature decreased within this range.

Embodiment 35

Production of Sheet for Vacuum Molding

A sheet (non-stretch) with a thickness of approximately 300 μm fabricated using embodiment 16 was used as the raw material.

<Vacuum Molding>

Molding was performed under the following conditions using a vacuum molder manufactured by Omori Co., Ltd. The mold had a cylindrical shape with an inside diameter of 100 mm and a draw depth of 40 mm
Preheat time: 5.0 (seconds)
Preheat temperature: 100 (° C.)
No cavity heating (approximately 15° C.)

<Heat Treatment>

The aforementioned molding was attached to an aluminum jig, and heat treatment was performed in an oven at 200° C.×15 minutes. Furthermore, after heat treatment, the molding was rapidly cooled by quickly throwing into 20° C. water together with the jig.

The molding obtained did not deform even when 98° C. hot water was applied. Furthermore, the molding had excellent transparency: HZ: 3.0(%), TT: 91.4(%), PT: 87.9(%)

POSSIBILITY OF INDUSTRIAL APPLICATION

The poly-lactic acid composition of the present invention has specific thermal properties. This is thought to be because stereocomplex structures are easily, selectively and uniformly formed. Therefore, various molding such as stretch films made from this composition will have excellent thermal resistance, gas barrier properties, and toughness compared to moldings made of the monoisomers poly-L-lactic acid and poly-D-lactic acid, and furthermore, the surface smoothness and transparency will also be excellent. Moldings such as injection moldings will have excellent processing properties (mold opening property) and transparency compared to conventional moldings.

Moldings such as films, sheets, and yarns obtained by various molding methods such as injection molding, blow molding, extrusion molding, or spinning will have excellent thermal resistance. This is because a stereocomplex structure is selectively formed during crystallization from a non-crystalline state, and crystallization of the composition of the present invention can easily be performed.

The invention claimed is:

1. A polylactic acid composition, which is prepared from 75 to 25 weight parts of poly-L-lactic acid and 25 to 75 weight parts of poly-D-lactic acid (sum of poly-L-lactic acid and poly-D-lactic acid equals 100 weight parts),
which is obtainable by melting and kneading poly-L-lactic acid and poly-D-lactic acid at a temperature in a range of 230 to 260° C. such that the weight average molecular weight of the aforementioned polylactic acid composition will be in a range of 0.3 to 0.6 times the value of the weight average molecular weight obtained by taking the weighted average of the weight average molecular weight of each of the poly-L-lactic acid and poly-D-lactic acid to be used,
and characterized in that:
(A) when measured by DSC, the cooling (10° C./minute) peak after 10 minutes at 250° C. is no less than 30 mJ/mg; or
(B) when measured during the DSC second heating (cooling at a rate of 10° C./minute after 10 minutes at 250° C., and heating again from 0° C. at a rate of 10° C./minute), the peak ratio (peak 1/peak 2) of the peak when Tm is between 150 and 180° C. (peak 1) and the peak when Tm is between 200 and 240° C. (peak 2) is 0.5 or less; or
(C) when measured during the DSC second heating (cooling at a rate of 10° C./minute after 10 minutes at 250° C., and heating again from 0° C. at a rate of 10° C./minute), the peak when Tm is in a range of 200 to 240° C. (peak 2) is no less than 35 mJ/mg.

2. The composition according to claim 1, prepared from between 75 and 25 weight parts of poly-L-lactic acid and between 25 and 75 weight parts of poly-D-lactic acid (sum of poly-L-lactic acid and poly-D-lactic acid equals 100 weight parts).

3. The composition according to claim 1, characterized in that the weight average molecular weight is between 10,000 and 300,000.

4. A molding formed from the composition described in claim 1.

5. The molding according to claim 4, formed by injection, blow, or vacuum/air pressure forming or by extruding.

6. A film molding according to claim 4, characterized by being an stretch film which is at least uniaxially stretched by at least a factor of two.

7. The film molding according to claim 6, characterized by being a stretch film which is longitudinally stretched by at least a factor of two and laterally stretched by at least a factor of two.

8. The stretch film according to claim 6, characterized by being heat treated at a temperature between 140 and 220° C. for 1 second or longer.

9. The stretch film according to claim 6, characterized by having wide angle x-ray diffraction peaks (2θ) in the vicinity of 12°, in the vicinity of 21°, and in the vicinity of 24°, and the ratio of the area (SSC) of these diffraction peaks is no less than 90% with respect to the sum (total area) of the area (SSC) of these diffraction peaks and the area (SPL) of a diffraction peak in the vicinity of 16°.

10. The stretch film comprising the composition according to claim 6, wherein deformation at 200° C. in a thermal deformation test using thermomechanical analysis is no greater than 10%.

11. The stretch film according to claim 6, characterized by not melting at 200° C.

12. The stretch film according to claim 6, wherein elongation in the stretched direction is no less than 10%.

13. The stretch film according to claim 6, wherein the breaking energy in the stretched direction is no less than 0.1 mJ.

14. The stretch film according to claim 6, characterized in that the surface roughness (SRa) is no greater than 0.1 μm for a biaxial stretch film obtained by stretching in the longitudinal direction by a factor of two or more and in the lateral direction by a factor of two or more.

15. A crystallization promoting agent for polylactic acid, comprising the composition described in claim 1.

16. A composition with crystallization promoting properties, obtained by kneading between 1 and 90 weight parts of the crystallization promoting agent described in claim 15 with between 99 and 10 weight parts of poly-L-lactic acid or poly-D-lactic acid.

17. A molding obtained by molding the composition according to claim 16.

18. The molding according to claim 17, obtained by molding by injection, blow, or vacuum/air pressure molding or by extruding.

19. A film molding according to claim 17, characterized by being a stretch film which is at least uniaxially stretched by at least a factor of two.

20. The stretch film according to claim 19, characterized by being heat treated at a temperature between 140 and 220° C. for 1 second or longer.

21. The composition according to claim 1 characterized in that the composition is prepared by kneading poly-L-lactic acid and poly-D-lactic acid where the weight average molecular weight of the poly-L-lactic acid and the poly-D-lactic acid is in a range between 6000 and 500,000, and the weight average molecular weight of at least one of either the poly-L-lactic acid or the poly-D-lactic acid is between 30,000 and 500,000.

22. The composition according to claim 1, obtained by kneading poly-L-lactic acid and poly-D-lactic acid with a weight average molecular weight between 150,000 and 350,000 (the weight average molecular weight of the poly-D-lactic acid being higher than the weight average molecular weight of the poly-L-lactic acid) using a weight ratio of poly-L-lactic acid to poly-D-lactic acid of between 75/25 and 25/75.

23. The composition according to claim 22, characterized in that when a press sheet obtained by pressing said composition at a temperature between 240 and 260° C. and then rapid cooling at a temperature between 0 and 30° C. is observed using a scanning electron microscope (SEM) after the poly-L-lactic acid is broken down and removed from the press sheet using an enzyme that breaks down poly-L-lactic acid, holes with a diameter of 5 µm are not observed.

24. A composition characterized in that the kneading according to claim 23 is performed using a twin screw kneader or a twin screw extruder.

25. A multilayer film obtained by laminating a silicon resin layer on at least one side of the stretch film according to claim 8.

26. The multilayer film according to claim 25, characterized by comprising a stretch film with a thickness between 1 and 300 µm, a cured resin layer with a thickness between 0.1 and 5 µm, and a silicon resin layer with a thickness between 0.01 and 5 µm.

27. The injection molding according to claim 5, characterized in that the transparency of the injection molding is such that the total light transmissivity (TT) at a thickness of 3 mm is 60% or higher.

28. The vacuum/air pressure molding according to claim 5, characterized by having thermal resistance not to be deformed by hot water.

29. The molding or film according to claim 4, characterized by having a layer made of a polymer of an unsaturated carboxylic acid or derivative thereof.

30. The molding according to claim 4, characterized by having an inorganic thin-film layer.

31. The stretch film according to claim 6, wherein the degree of surface orientation as measured by the Abbe method is no less than 0.001.

* * * * *